(12) United States Patent
Harada et al.

(10) Patent No.: US 7,503,506 B2
(45) Date of Patent: Mar. 17, 2009

(54) IC TAG MOUNTING STRUCTURE

(75) Inventors: Tomoyuki Harada, Saitama (JP);
Toshio Yamagiwa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 265 days.

(21) Appl. No.: 11/434,242

(22) Filed: May 16, 2006

(65) Prior Publication Data
US 2006/0261146 A1 Nov. 23, 2006

(30) Foreign Application Priority Data
May 18, 2005 (JP) ............................. 2005-145840

(51) Int. Cl.
*G06K 19/06* (2006.01)
(52) U.S. Cl. ..................................... 235/492
(58) Field of Classification Search ................. 235/492, 235/375, 381, 383, 384, 385, 493; 340/539.1, 340/928, 438, 425.5
See application file for complete search history.

(56) References Cited

U.S. PATENT DOCUMENTS

| | | | |
|---|---|---|---|
| 6,859,757 B2 * | 2/2005 | Muehl et al. ................. | 702/184 |
| 7,341,197 B2 * | 3/2008 | Muehl et al. ................. | 235/492 |
| 2002/0145542 A1 * | 10/2002 | Yamashita ................... | 340/935 |
| 2004/0024501 A1 * | 2/2004 | Muehl et al. .................. | 701/29 |
| 2004/0024570 A1 * | 2/2004 | Muehl et al. ................. | 702/184 |
| 2005/0190043 A1 * | 9/2005 | Yamagiwa ............... | 340/425.5 |
| 2005/0196704 A1 * | 9/2005 | Baba et al. .................. | 430/311 |
| 2006/0015730 A1 * | 1/2006 | Yuhara ....................... | 713/175 |
| 2006/0166546 A1 * | 7/2006 | Ashizawa et al. ........... | 439/373 |

FOREIGN PATENT DOCUMENTS

JP    2004-178483 A    6/2004

\* cited by examiner

*Primary Examiner*—Thien M Le
(74) *Attorney, Agent, or Firm*—Birch, Stewart, Kolasch & Birch, LLP

(57) ABSTRACT

To provide an IC tag mounting structure in which the probability is reduced that the IC tag mounted on a vehicle is replaced for repair or maintenance. The IC tag is mounted to any one of main functional components and internal components of an engine of the vehicle, air-inlet system components, brake system components, rear wheel suspension system components, and a storage box that can be locked.

10 Claims, 36 Drawing Sheets

VEHICLE INFORMATION DATABASE
OWNER'S DATA

| VEHICLE ID | OWNER | | | |
|---|---|---|---|---|
| | NAME | DATE OF BIRTH | ADDRESS | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |

FIG. 12

VEHICLE INFORMATION DATABASE
VEHICLE HISTORY DATA

| VEHICLE ID | XXXXXXX | |
|---|---|---|
| DATE | OUTLINE HISTORY | DETAILED HISTORY |
| YY/MM/DD | MANUFACTURE OF NEW VEHICLE | XXX COMPANY, XXX FACTORY |
| YY/MM/DD | REGISTRATION OF OWNER | NAME OF OWNER: XXX, ADDRESS: XXX |
| YY/MM/DD | FUELING | SERVICE STATION: XXX, FUEL AMOUNT: XXX LITRE |
| YY/MM/DD | FUELING | SERVICE STATION: XXX, FUEL AMOUNT: XXX LITRE |
| YY/MM/DD | FUELING | SERVICE STATION: XXX, FUEL AMOUNT: XXX LITRE |
| YY/MM/DD | REPAIR | REPAIR FACTORY: XXX, REPAIR CONTENTS: XXXX |
| YY/MM/DD | FUELING | SERVICE STATION: XXX, FUEL AMOUNT: XXX LITRE |
| YY/MM/DD | CHANGE OF OWNER | OWNER'S NAME: XXX, ADDRESS: XXXX |
| ⋮ | ⋮ | ⋮ |
| YY/MM/DD | DELETION OF REGISTRATION | |
| YY/MM/DD | WASTE PRODUCT MANAGEMENT SHEET ISSUED | |
| YY/MM/DD | | |
| YY/MM/DD | | |
| YY/MM/DD | | |
| YY/MM/DD | | |

FIG. 14

VEHICLE INFORMATION DATABASE
WASTE PRODUCT MANAGEMENT ISSUING DATA

| VEHICLE ID | |
|---|---|
| WASTE PRODUCT MANAGEMENT SHEET ISSUED FLAG | |
| WASTE TREATMENT CODE | |
| INFORMATION ABOUT DISCHARGE AGENCY | PUBLIC KEY OF DISCHARGE AGENCY |
| INFORMATION ABOUT COLLECTING/TRANSPORTING AGENCY | PUBLIC KEY OF COLLECTING/TRANSPORTING AGENCY |
| INFORMATION ABOUT INTERMEDIATE TREATMENT AGENCY | PUBLIC KEY OF INTERMEDIATE TREATMENT AGENCY |
| INFORMATION ABOUT FINAL TREATMENT AGENCY | PUBLIC KEY OF FINAL TREATMENT AGENCY |

FIG. 15

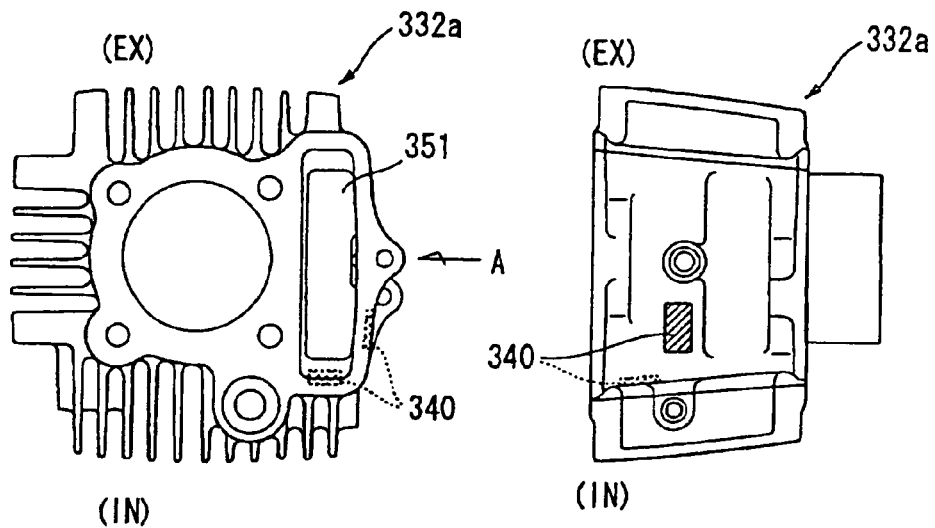
FIG. 21(a)     FIG. 21(b)
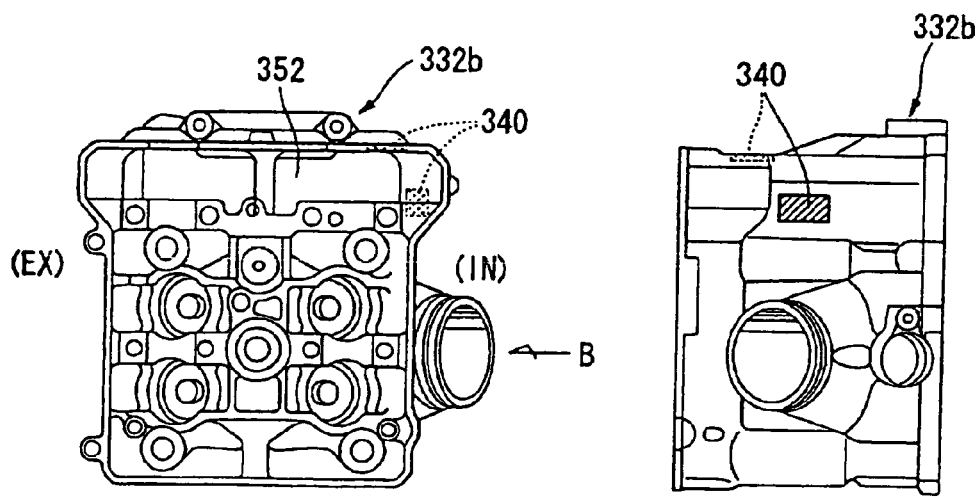
FIG. 22(a)     FIG. 22(b)

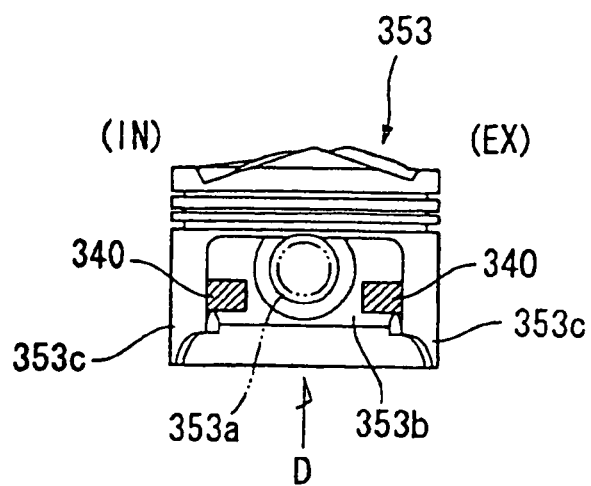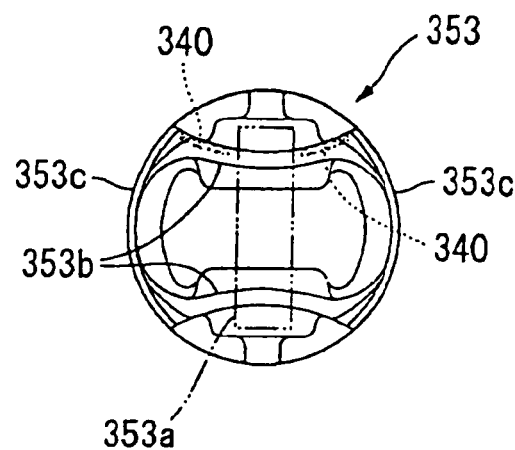
FIG. 24(a)    FIG. 24(b)
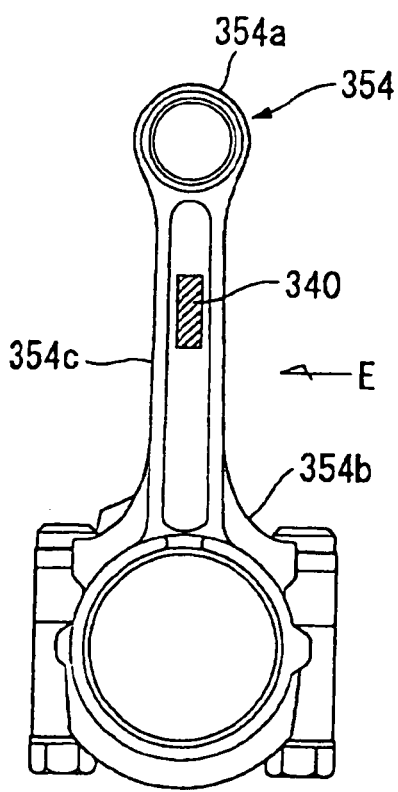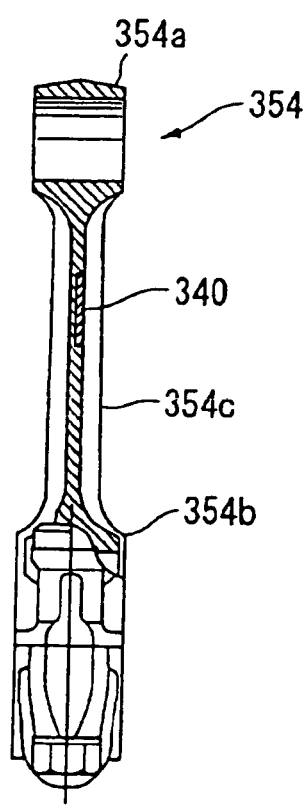
FIG. 25(a)    FIG. 25(b)

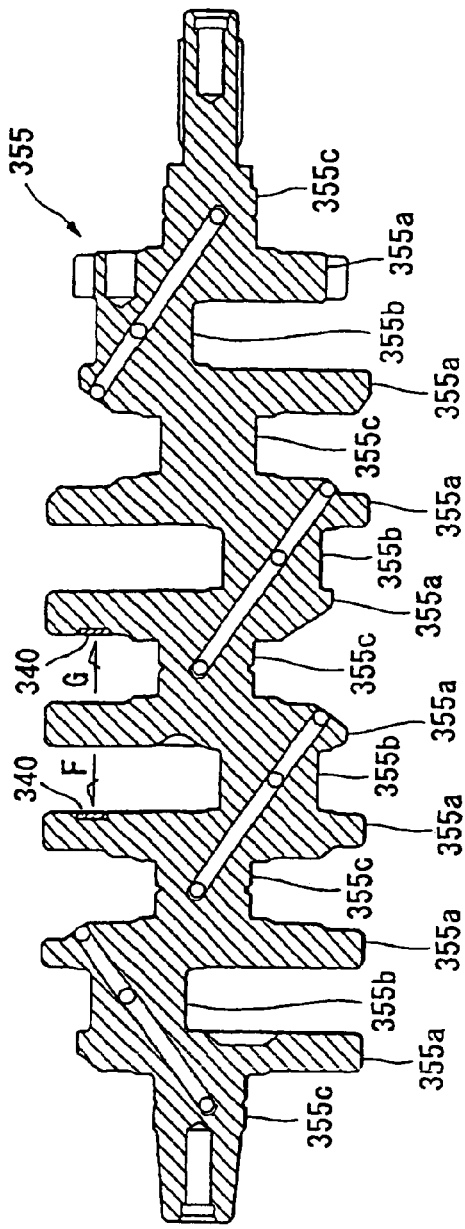
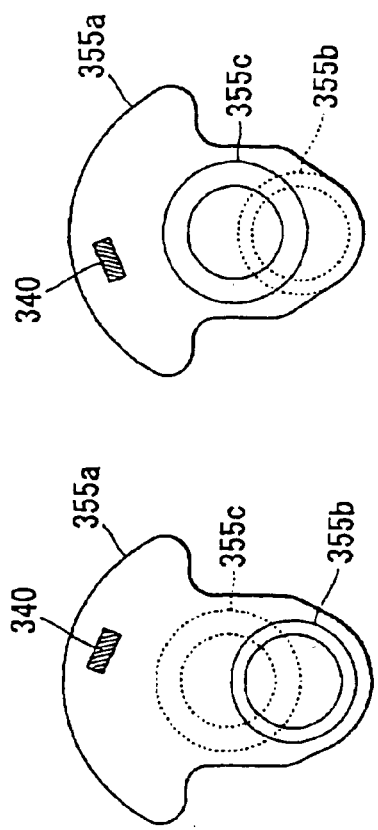
FIG. 26(a)
FIG. 26(b)
FIG. 26(c)

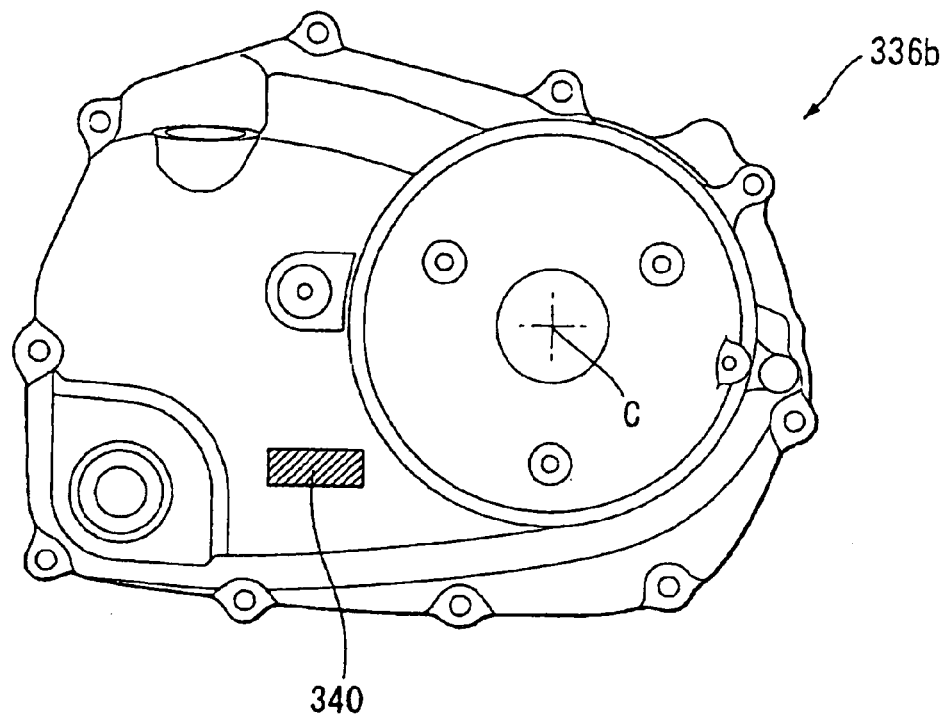
FIG. 29
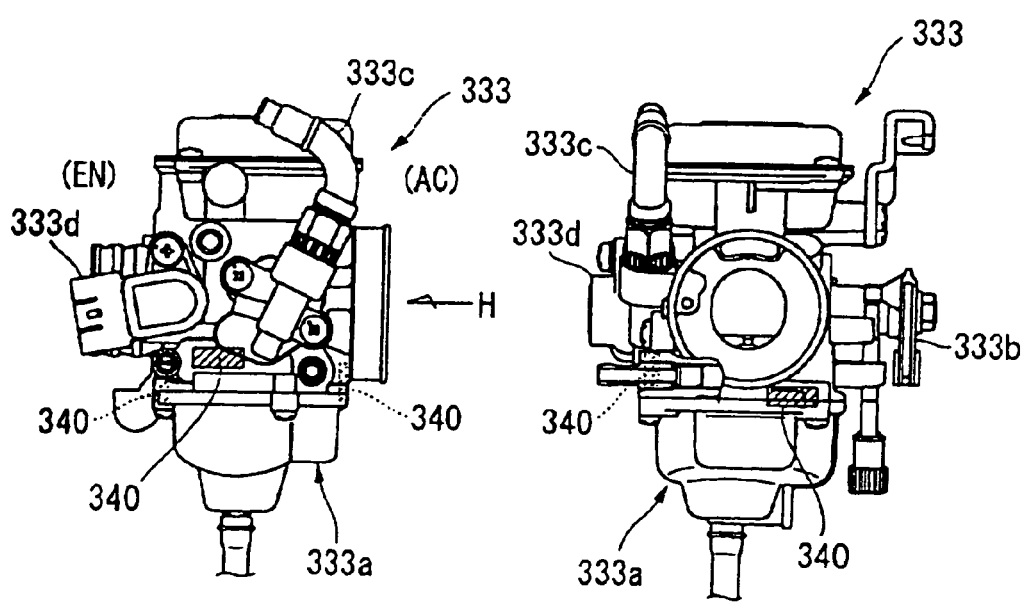
FIG. 30(a)  FIG. 30(b)

IC TAG MOUNTING STRUCTURE

CROSS-REFERENCE TO RELATED APPLICATIONS

The present application claims priority under 35 USC 119 to Japanese Patent Application No. 2005-145840 filed on May 18, 2005 the entire contents of which are hereby incorporated by reference.

FIELD OF THE INVENTION

The present invention relates to a mounting structure of an IC tag to a vehicle such as a motorcycle.

DESCRIPTION OF BACKGROUND ART

Technology is known wherein an IC tag is integrally provided with a principal component of the vehicle with the aim of protecting the vehicle against theft. See, for example, JP-A-2004-178483.

A management system is in the course of approval wherein information about production, sales, inspection, repair, disposability, or recycling of a vehicle is registered in the IC tag for later utilization.

In this case, since data is read from and written in the IC tag frequently, it is preferable to provide an IC tag on components of the vehicle which are visible on the vehicle so as to ensure satisfactory communication. However, such components include components that are replaced by a user of the vehicle for repair or maintenance. Therefore, it is necessary to identify a component on which the IC tag is to be placed while considering the necessity to cause the IC tag to exist semi-eternally on the vehicle.

SUMMARY AND OBJECTS OF THE INVENTION

Accordingly, the present invention provides an IC tag mounting structure for reducing the probability that the IC tag mounted on the vehicle is replaced for repair or maintenance.

As means for solving the above-described problem, according to an embodiment of the present invention a mounting structure of an IC tag 340 is provided wherein predetermined information about a vehicle is registered. The vehicle, for example, a motorcycle 301, may include the IC tag mounted to a main functional component, for example, a cylinder 332a, a cylinder head 332b, or a crankcase 336 of an engine of the vehicle.

According to an embodiment of the present invention, the main functional component of the engine includes an internal component, for example, a piston 353, a connecting rod 354, or a crankshaft 355, of the engine.

According to an embodiment of the present invention, the main functional component of the engine may be one of a cylinder, a cylinder head, and a crankcase.

According to an embodiment of the present invention, the internal component of the engine is any one of a piston, a connecting rod, and a crankshaft.

In this arrangement, since the probability that the IC tag is replaced for repair or maintenance is reduced by mounting the IC tag to the engine system component of the vehicle, the IC tag can exist on the vehicle semi-eternally. Since many of the engine system components are formed by casting, a recess or the like for mounting the IC tag can be formed easily. Thus, the IC tag can be integrated easily.

According to an embodiment of the present invention, a mounting structure of an IC tag 340 is provided wherein predetermined information about a vehicle is registered. The vehicle, for example, a motorcycle 301, includes the IC tag that is mounted to an air-inlet system component, for example, a fuel supply device 333, or an air cleaner box 334 in the embodiment, of the vehicle.

According to an embodiment of the present invention, the air-inlet system component is any one of a fuel supply device and an air cleaner box.

In this arrangement, since the probability that the IC tag is removed for repair or maintenance by mounting the IC tag to the air-inlet system component which is located in the vicinity of the engine system component, the IC tag can be maintained on the vehicle for a long term. In addition, since the air-inlet system component is less subject to engine heat and the cooling property thereof is favorable, it achieves an arrangement of the IC tag which is advantageous in terms of durability or the like.

According to an embodiment of the present invention, a mounting structure of an IC tag 340 is provided wherein predetermined information about a vehicle is registered. The vehicle, for example, a motorcycle 301 in the embodiment, includes the IC tag that is mounted to a brake system component of the vehicle, for example, a brake caliper 324, a front brake master cylinder 357, a brake reservoir tank 357b, a rear brake master cylinder 358, an ABS modulator 359, a brake hose 360, and a brake panel 361 in the embodiment.

According to an embodiment of the present invention, the brake system component is any one of a brake caliper, a brake master cylinder, a brake reservoir tank, an ABS modulator, a drum brake panel, and a brake hose.

In this arrangement, the brake system components are important security components and the user rarely does maintenance on these components directly. Thus, the probability is reduced that the IC tag that is mounted to the brake system component is removed. Therefore, a favorable arrangement for maintaining the IC tag for a long term is achieved.

According to an embodiment of the present invention, a mounting structure of an IC tag 340 is provided wherein predetermined information about a vehicle is registered. The vehicle, for example, a motorcycle 301 in the embodiment, includes the IC tag that is mounted to a rear wheel suspension system component, for example, a shock absorber unit 314, a swing arm 313 in the embodiment, of the vehicle.

According to an embodiment of the present invention, the rear suspension system component is any one of a swing arm and a shock absorber.

In this arrangement, the rear wheel suspension system component cannot be disassembled easily and the user rarely does maintenance on these components directly. Thus, the probability is reduced that the IC tag that is mounted to the rear wheel suspension system component is removed. Therefore, a favorable arrangement for maintaining the IC tag for a long term is achieved.

According to an embodiment of the present invention, a mounting structure of an IC tag, for example, an IC tag 340 in an embodiment, is provided wherein predetermined information about a vehicle is registered. The vehicle, for example, a motorcycle 301, 1 in the embodiment, includes the IC tag that is mounted to a storage box, for example, storage boxes 319a, 16a in the embodiment, of the vehicle.

According to an embodiment of the present invention, the storage box includes a locking mechanism, for example, locking mechanisms 319b, 16b in the embodiment.

In this arrangement, by mounting the IC tag in the storage box that can be locked, an access (mischief or the like) by a third party can be effectively prevented. In addition, since the storage box is not exposed with respect to the appearance of the vehicle, the probability is low that the user replaces the same for repair or maintenance. Therefore, an arrangement preferable for maintaining the IC tag for a long term is achieved. Many of the storage boxes are formed by molding resin. Thus, a recess for mounting the IC tag can easily be formed. In addition, an insert molding of the IC tag is also possible. Therefore, the IC tag can be easily integrated.

According to an embodiment of the present invention, the IC tag can be integrated easily so that the IC tag can exist on the vehicle semi-eternally.

According to an embodiment of the present invention, the IC tag can be arranged at a position advantageous in terms of durability, and the IC tag can be maintained on the vehicle for a long term.

According to an embodiment of the present invention, a favorable arrangement of the IC tag for maintaining the same for a long term is achieved.

According to an embodiment of the present invention, the IC tag can be easily integrated and mischief by a third party can be effectively prevented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 12 is a drawing showing a data structure of owner's data;

FIG. 14 is a drawing showing a data structure of vehicle history data;

FIG. 15 is a drawing showing a data structure of waste product management sheet issuing data;

FIG. 21(a) is a plan view of a cylinder as an engine system component when viewed from a head side; and FIG. 21(b) is a drawing viewed in a direction indicated by an arrow A in FIG. 21(a);

FIG. 22(a) is a plan view of the cylinder head as the engine system component; and FIG. 22(b) is a drawing viewed in a direction indicated by an arrow B in FIG. 22(a);

FIG. 24(a) is a side view of a piston as the engine system component; and

FIG. 24(b) is a drawing viewed in a direction indicated by an arrow D in FIG. 24(a);

FIG. 25(a) is a side view of a connecting rod as the engine system component; and FIG. 25(b) is a drawing viewed in a direction indicated by an arrow E in FIG. 25(a);

FIG. 26(a) is a cross-sectional view taken along an axis of a crankshaft as the engine system component;

FIG. 26(b) is a drawing viewed in a direction indicated by an arrow F in FIG. 26(a); and FIG. 26(c) is a drawing viewed in a direction indicated by an arrow G in FIG. 26(a);

FIG. 29 is a side view of a crankcase right cover of the engine;

FIG. 30(a) is a side view of a fuel supply device as an engine air-inlet system component;

FIG. 30(b) is a drawing viewed in a direction indicated by an arrow H in FIG. 30(a);

FIG. 51(b) is a cross-sectional view taken along an axis of a single handle grip;

DETAILED DESCRIPTION OF THE PREFERRED EMBODIMENTS

EXAMPLE 1

Figure 1:
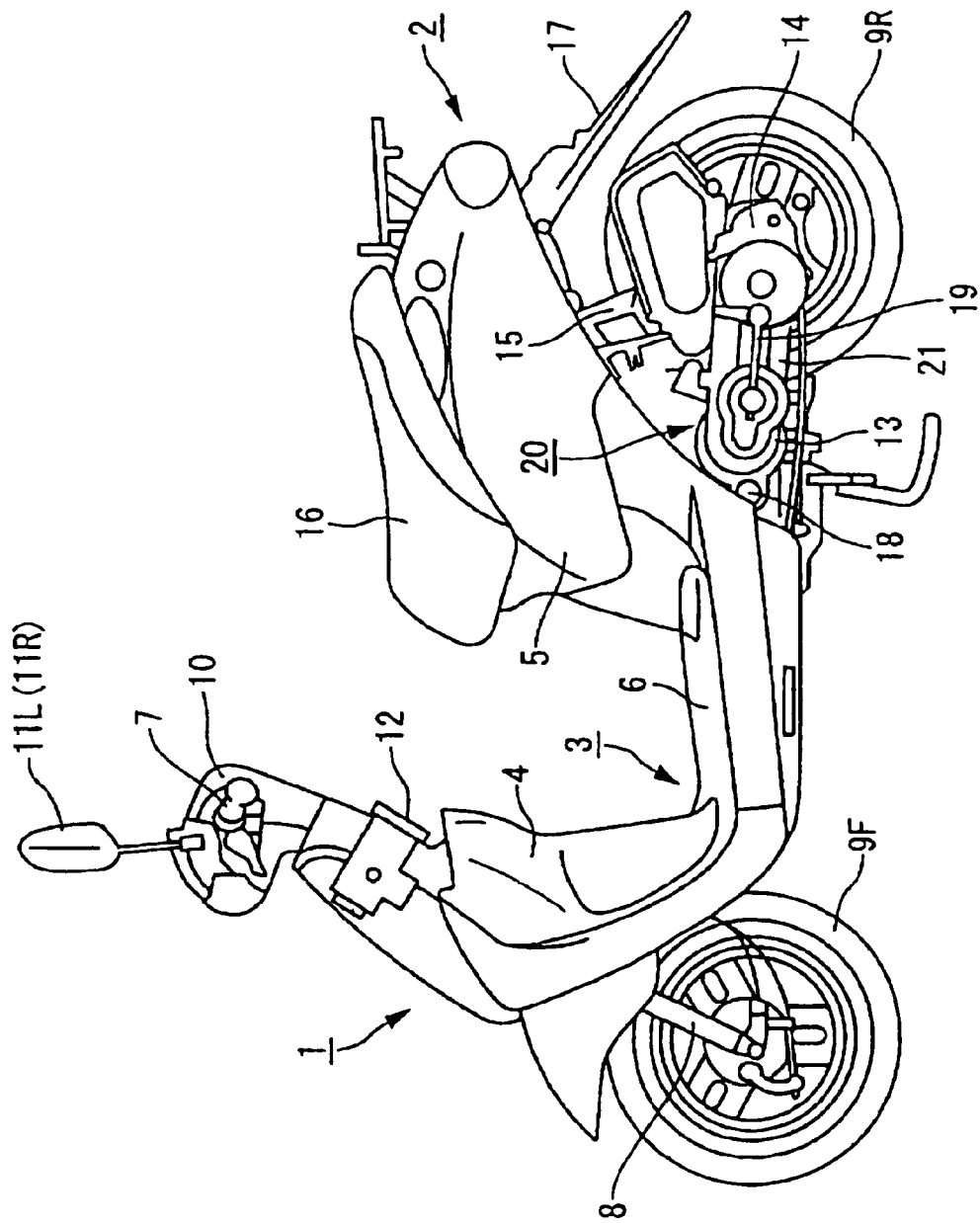
FIG. 1 is an appearance side view of an IC tag mounted vehicle according to a first embodiment of the present invention.

Referring now to the drawings, preferred embodiments of the present invention will be described. However, the present invention is not limited to the respective embodiments shown below and, for example, the components in these embodiments may be combined as needed.

FIG. 1 illustrates a side view of a scooter-type motorcycle to which the present invention is applied. A vehicle front portion 1 and a vehicle rear portion 2 are connected via a low floor portion 3, and a framework of these portions is formed of a vehicle body frame composed generally of a down tube and a main pipe.

The vehicle front portion 1, the vehicle rear portion 2, and the floor portion 3 are covered respectively by a front cover 4, a body cover 5, and a center cover 6. The vehicle front portion 1 is provided with a handle 7 supported about an axis by a steering head on an upper portion thereof, a front fork 8 extending downwardly thereof, and a front wheel 9F supported pivotally at a lower end thereof.

A swing unit 20 is connected and supported at a lower end of a rising portion of the main pipe 7 via a link member 18 so as to be capable of swinging. A four-cylinder 4-cycle engine 13 is mounted in front of the swing unit 20. A kick pedal 19 for starting the engine when a battery voltage is lowered is connected to a crankshaft of the engine 13. A belt-type continuously variable transmission 21 is configured from the engine 13 toward the rear, and a rear wheel 9R is supported about an axis by the deceleration mechanism 14 provided on the rear portion of the continuously variable transmission 21 via a centrifugal clutch. A rear shock absorber 15 is interposed between an upper portion of the deceleration mechanism 14 and the main pipe.

An upper portion of the handle 7 is covered by a handle cover 10 which also serves as an instrument panel. The steering head, the front fork 8 and the handle 7 constitute steering means. Grip portions of the handle 7 project from the handle cover 10 toward the left and right of the vehicle body and side mirrors 11L (11R) project upwardly therefrom. A handle lock module 12 locks the handle 7 and disables the steering.

A seat 16 is provided above the body cover 5 so as to cover a storage box. The seat 16 can be opened and closed and a helmet or the like can be stored in the storage box on a lower portion thereof. A number plate mounting portion 17, a loading platform, a tail lamp, and so on are provided on a rear portion of the body cover 5. An inlet pipe, a carburetor, and an air cleaner are also provided in association with the engine, although they are not shown in the drawing.

Figure 2:
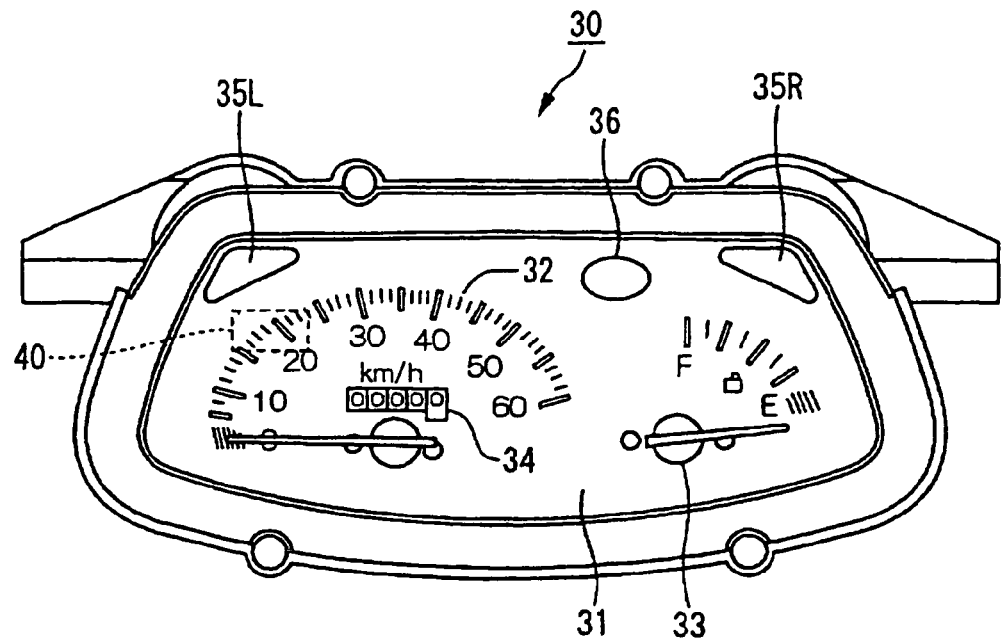
FIG. 2 is a front view of a meter unit.
Figure 3:
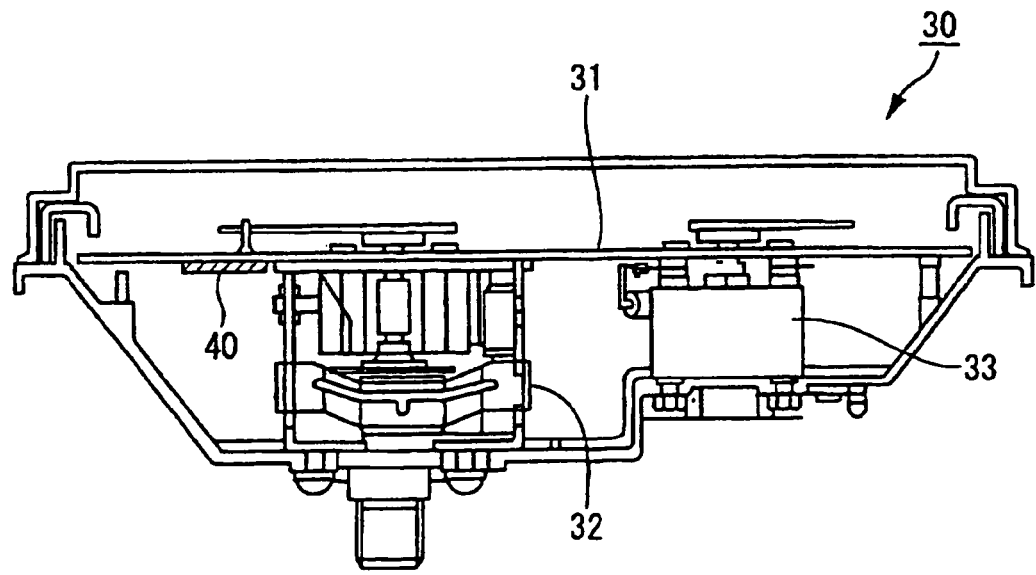
FIG. 3 is a cross-sectional structural drawing of the meter unit.

FIG. 2 is a front view of a meter unit 30 integrated in the handle cover 10, and FIG. 3 shows a cross-sectional structure of the same.

A body case of the meter unit 30 and a meter panel 31 are both formed of resin material being permeable to radio waves. In addition, the meter panel 31 is provided with a speed indicator 32, a fuel indicator 33, a distance recorder 34, left and right blinker indicators 35L, 35R, and an ignition indicator 36 arranged thereon. An IC tag 40 in which an ID code in a uniform data format is registered is mounted on a back side of the meter panel 31 as shown in FIG. 3.

Figure 4:
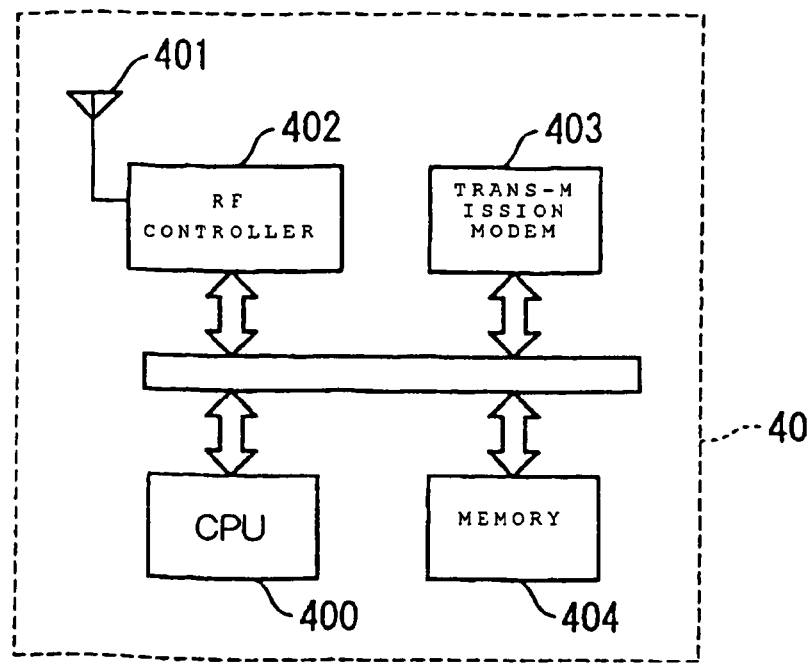
FIG. 4 is a block diagram of a principal portion of the IC tag.

FIG. 4 is a block diagram showing a structure of a principal portion of the IC tag 40, including an RF antenna 401 for transmitting radio waves in an RF band, an RF controller 402 for controlling the RF antenna, a transmission modem 403 for modulating information stored in a memory 404 and sending the same from the RF antenna 401 as well as detecting the radio waves received by the RF antenna 401, and a CPU 400 for controlling the respective blocks. In this embodiment, the IC tag 40 is resin molded and is mounted to the back surface of the meter panel 31. In this embodiment, since the mold resin is permeable to radio waves, the mold resin, the meter panel 31 and the case of the meter unit 30 do not affect the transmitting waves from/to the IC tag 40 as a shielding substance.

In the IC tag 40, at least a vehicle ID that identifies the vehicle in question is registered, and recycling information that can be consulted when recycling the vehicle in question, or, for example, the type of industrial waste, numerical quantity, shape and style of packing, names of collecting and hauling agencies, names of disposal contractor, final disposal site, and handling instruction as information that is obliged to describe under Manifest System can be registered.

Identification information that indicates materials of the respective components of the vehicle in question, identification information that specifies a recommended time of replacement of articles of consumption such as headlight, tire, or engine oil and contractor for replacement work, maintenance record or repair record such as contents of maintenance of the vehicle in question, names of contractor for maintenance, travel distance at a time of maintenance, a record of insurance contract of the vehicle in question such as type of insurance, name of contractor, contents of contract, term of insurance, tax record of the vehicle in question, information recorded on the vehicle inspection certificate and information relating to an owner of the vehicle can also be registered. Such information can be read and recorded by wireless communication utilizing a specific terminal.

In this manner, according to this embodiment, since the IC tag 40 is stored in a highly hermetical meter unit, it is not affected by wind or rain even when it is mounted to the vehicle which is operated in the open air. Furthermore, since the IC tag 40 is mounted to the back surface of the meter panel 31, it can hardly be affected by an UV ray. In addition to that, since the meter panel 31 is formed of a resin material permeable to radio waves, the above-described effects are achieved without lowering sensitivity of radio communication.

According to this embodiment, since the vehicle ID can be registered to the IC tag 40, the owner of the vehicle in question can be determined easily if the vehicle in question is dumped illegally. In addition, if the vehicle in question is stolen, it can be verified easily. Therefore, the stolen vehicle can be found easily, and illegal export of the stolen vehicle can be prevented.

According to this embodiment, since the maintenance record or the repair record can be registered to the IC tag 40, consultation of the maintenance history or the repair history is possible. In addition, by registering the travel distance at the time of maintenance or repair, the presence or absence of resetting the meter for falsifying the travel distance can be determined. According to this embodiment, since the record of insurance contract, the tax record, or the contents of the vehicle inspection certificate can be registered to the IC tag 40, they can be easily verified.

In the description of the above-described embodiment, the IC tag 40 is resin molded, and is mounted to the back surface of the meter panel 31. However, it is also possible to embed the same in the resin of the resin case by a technique such as insert molding or the like.

Figure 5:
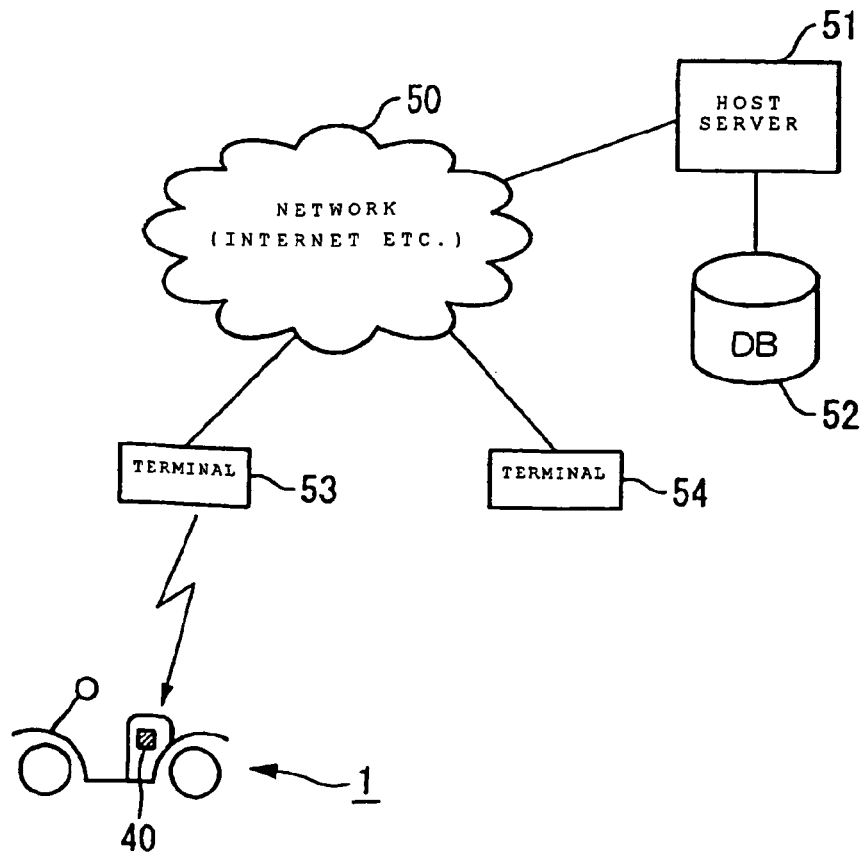
FIG. 5 is a block diagram of an IC-tag-mounted vehicle management system according to a second embodiment of the present invention.

In the description of the above-described embodiment, information with various data including the vehicle ID is registered in the IC tag 40 as in the case of the second embodiment shown in FIG. 5. However, the present invention is not limited thereto, and it is also possible to register only the vehicle ID in the IC tag 40, and information including other data (hereinafter referred to as tag information) is managed by a host server 51 provided in a network 50 so as to be readable as needed from a database (DB) 52 in the server 51 using the vehicle ID as a search key.

EXAMPLE 2

Referring now to the drawings, a second embodiment of the present invention will be described.

In FIG. 5, the network 50 is a wide area network represented by an internet, and the host server 51 is connected to the network 50. A data base 52 is connected to the host server 51. The database 52 includes recycling information, information that is obliged to be described under the Manifest System, maintenance record, the repair record, record of insurance contract, tax record, and information about the owner of the vehicle in question for a number of vehicles, which are recorded in the IC tags 40 of the respective vehicles in the first embodiment, are managed by the vehicle IDs and stored as the tag information.

IC tag transmitting terminals 53, 54 . . . provided respectively for vehicle manufacturers, vehicle sales agents, repair and maintenance contractors, recycling contractors, and waste disposers are connected to the network 50, and the respective terminals 53, 54 can access the host server 51 and the data-base 52 via the network 50. The respective terminals 53, 54 communicate with the IC tag 40 mounted to a vehicle 1, and call the vehicle ID registered in the IC tag 40 in question.

Figure 6:
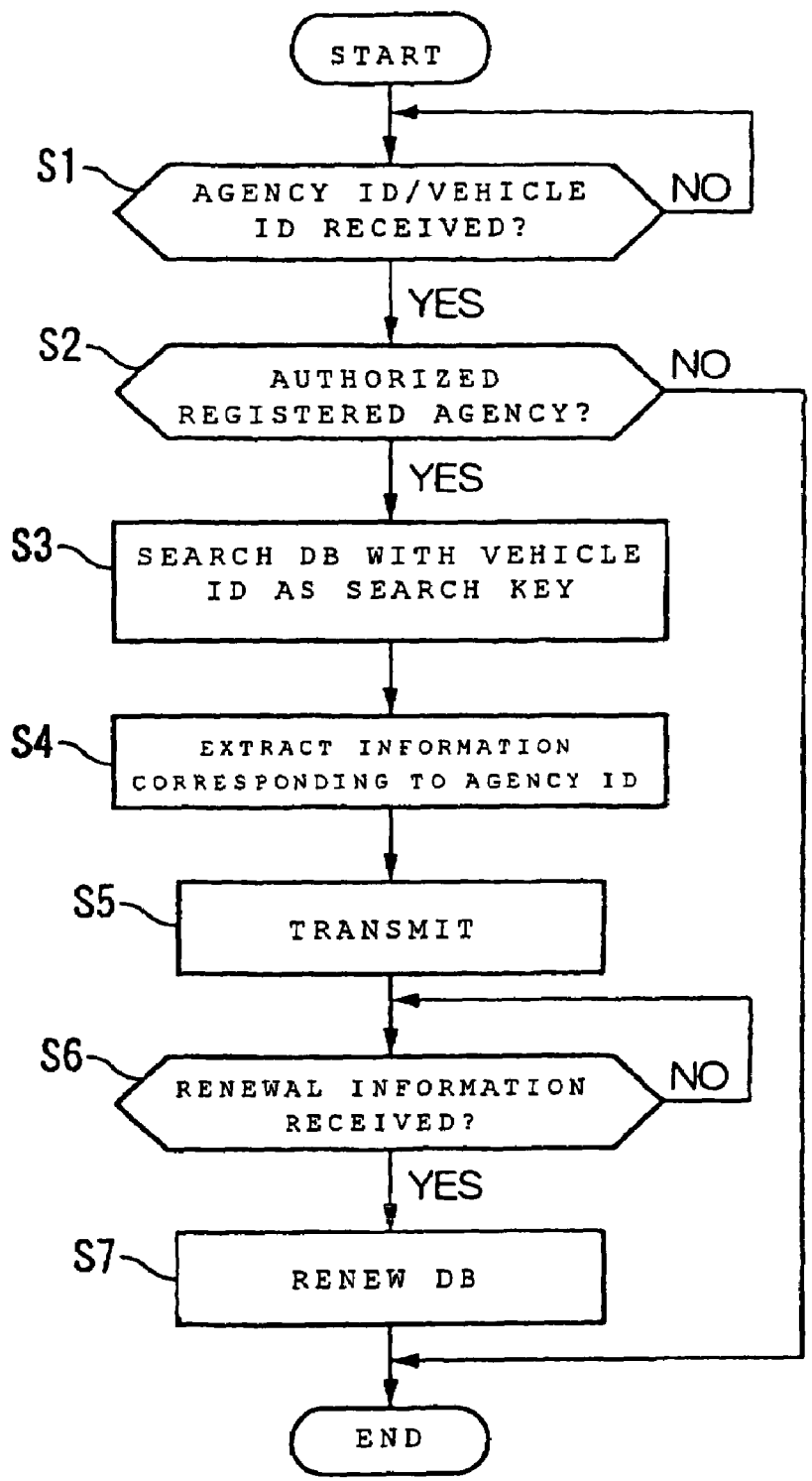
FIG. 6 is a flow chart showing an operation of the IC-tag-mounted vehicle management system.

FIG. 6 is a flow chart showing an operation of the embodiment described above. The operation of an IC-tag-mounted vehicle management system according to this embodiment will be described mainly on the basis of the operation of the host server 51.

For example, when the repair/maintenance contractor takes on the maintenance of the vehicle 1, the vehicle ID registered in the IC tag 40 of the vehicle in question 1 is read by the terminal 53, and the vehicle ID is transmitted to the network 50 together with a contractor ID that is specific for each contractor.

The host server 51 receives the vehicle ID and the contractor ID in Step S1, and then whether or not the contractor ID is an authorized and registered contractor who receives permission to access to the server is determined in Step S2. When the contractor ID is already registered, the procedure goes to Step S3, and the database 52 searches the vehicle ID as a search key.

In Step S4, only part of tag information that the contractor specified by the contractor ID is permitted to access out of the tag information including a number of registered data relating to the vehicle ID in question is extracted, and is transmitted to the terminal 53 in Step S5. The repair and maintenance contractor who gets a contract to maintenance of the vehicle displays the extracted tag information about the display of the terminal 53 and makes reference thereto, and renews part of or all the tag information according to the contents of the maintenance performed for the vehicle 1. When the host server 1 receives the renewed contents in Step S6, the registered tag information in the database 52 is replaced by the renewed tag information, whereby renewing the database 52 in Step S7.

In this manner, according to this embodiment, only the vehicle ID is registered in the IC tag 40 which is mounted to the vehicle 1, and the tag information with other data is intensively managed by the database 52 in the host server 51. Thus, the storage capacity of the IC tag 40 can be reduced.

EXAMPLE 3

Referring now to the drawings, a third embodiment of the present invention will be described.

Figure 7:
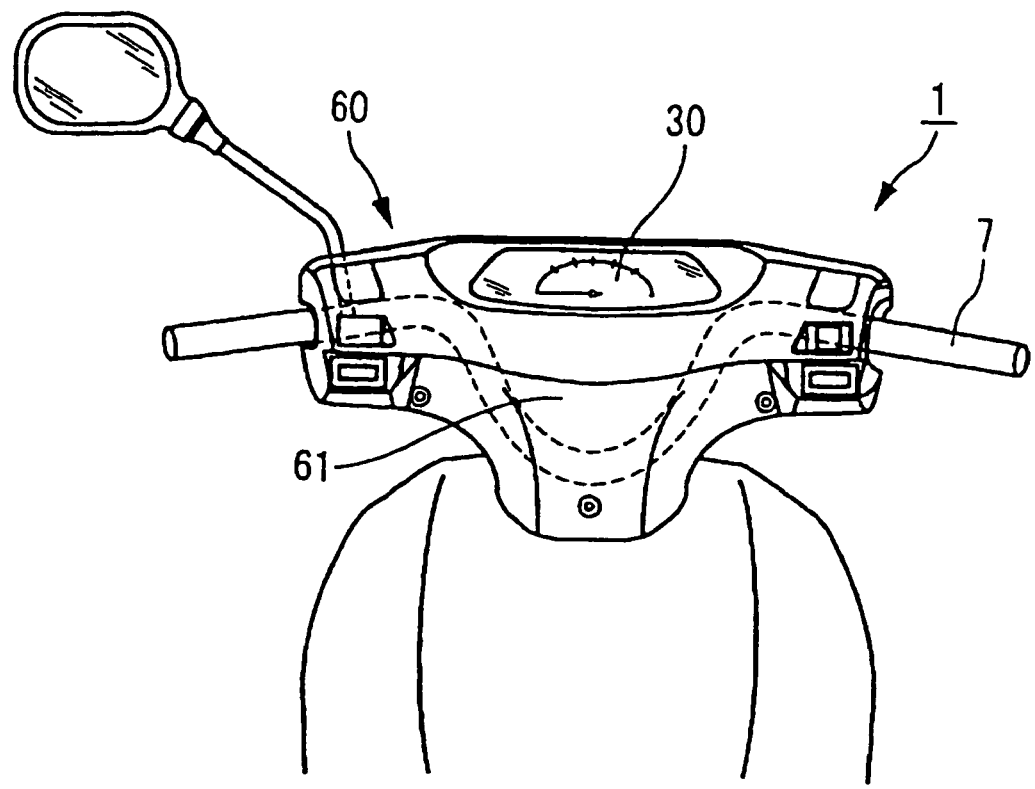
FIG. 7 is a perspective view of a portion around a handle on a front side of the IC tag mounted vehicle according to a third embodiment of the present invention when viewed from the rider's seat.

FIG. 7 is a perspective view of a periphery of the handle on the front side when viewed from a rider's seat of the scooter type (saddle-type) motorcycle to which the present invention is applied.

In these drawings, the handle 7 on the vehicle front portion 1 is secured to a top of the handle revolving shaft, and the handle revolving shaft is supported by the head pipe portion of the vehicle body frame so as to be capable of rotating about an axis thereof and incapable of moving in the axial direction, and a lower end thereof is connected to a pair of the left and right front forks 8 for steering the front wheel 9F.

A periphery of the handle 7 is covered by a handle cover over a major part thereof except for the meter unit 30 and the grip portions, and the handle cover includes a front handle cover 60 and a rear handle cover 61.

The handle cover is fixed to and supported by the handle 7 as a whole in such a manner that the rear handle cover 61 is secured to mounting means (not shown) secured to the handle 7 with a bolt or the like and the front handle cover 60 is secured to the rear handle cover 61 with a bolt or the like, or fixed by a fitting relation between a projection and a depression.

Figure 8:
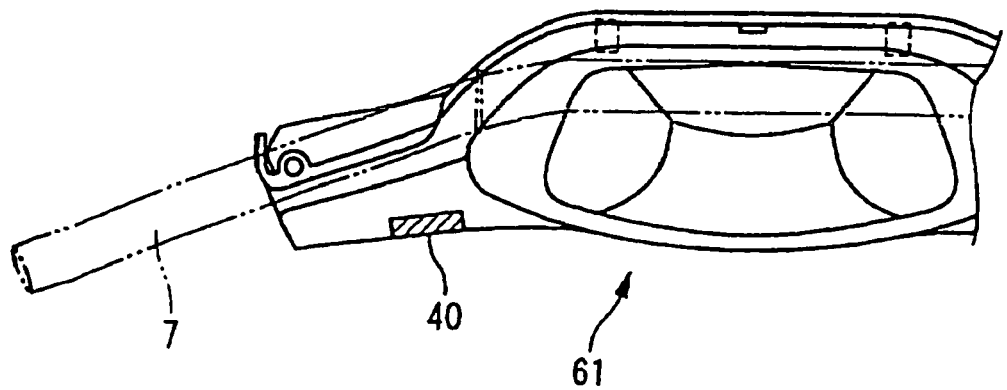
FIG. 8 is a plan view of a portion around the handle on the front side.

A mode of being embedded in the front handle cover 60 and the rear handle cover 61 is a mode of being secured to a back side, and as shown in FIG. 8, the IC tag 40 in which the ID code in a uniform format is registered is mounted. The IC tag 40 may be mounted to a fender or the like as a component in front of the vehicle. It is also possible to mount the IC tag 40 to the part on a rear part of the vehicle. More specifically, the IC tag 40 is mounted to the number plate mounting portion (number plate mounting stay) 17, a rear portion of the seat 16, the loading platform, the tail lamp or the like shown in FIG. 1. The IC tag 40 may be mounted to the seat 16 in the mode of being secured to a back side as the mode of being embedded in the seat 16 in the same manner as the resin covers.

The position of mounting the IC tag has been described in the case of a motorcycle (an autocycle is also included) in the description shown above. However, the IC tag 40 may also be mounted to components in the periphery of the handle 7 on the front side or to components in a periphery of the number plate mounting portion 17 on the rear side of saddle-type vehicles such as bicycles, personal watercrafts (PWC) or four-wheel buggies in addition to motorcycles.

Since a plurality of the saddle-type vehicles are transported and stored in a state of being arranged in parallel, a mobile IC tag reading device is directed thereto from the front or the rear thereof, not from the side thereof. Then, transmitted radio wave outputted from the IC tag mounted in the vicinity of the handle on the front side of the saddle-type vehicle or in the vicinity of the number plate on the rear side of the vehicle body reaches the reading device without being blocked. Therefore, the reading distance is shorter than in a case of being mounted to a periphery of the floor portion 3 at the center of the vehicle or to the body cover 5 and the center cover 6. Thus, the state of the radio waves is favorable, the data can be read easily, and the output of the radio wave from the IC tag 40 or the reading device can be reduced, whereby downsizing of the IC tag and reduction of cost caused by the radio wave output of the reading device are achieved.

The electromagnetic wave transmits from the portions around the handle, around the meters and around the fender, the number plate mounting portion 17, a rear portion of the seat 16, the loading platform, and the tail lamp as a matter of course. In addition, the electromagnetic wave is transmitted inside and on the back side of the handle cover 60, the rear handle cover 61, and the seat 16. Thus, mounting the IC tag to the components on the front portion of the vehicle is convenient for reading or writing the stored information in the IC tag using a signal of electromagnetic wave. The IC tab is adapted to be secured to the vehicle from manufacture to discard of the vehicle, and the IC tag is prevented from coming apart easily by being mounted in the handle cover 60, the rear handle cover 61 and the seat 16.

EXAMPLE 4

Referring now to the drawings, a fourth embodiment of the present invention will be described.

Figure 9:
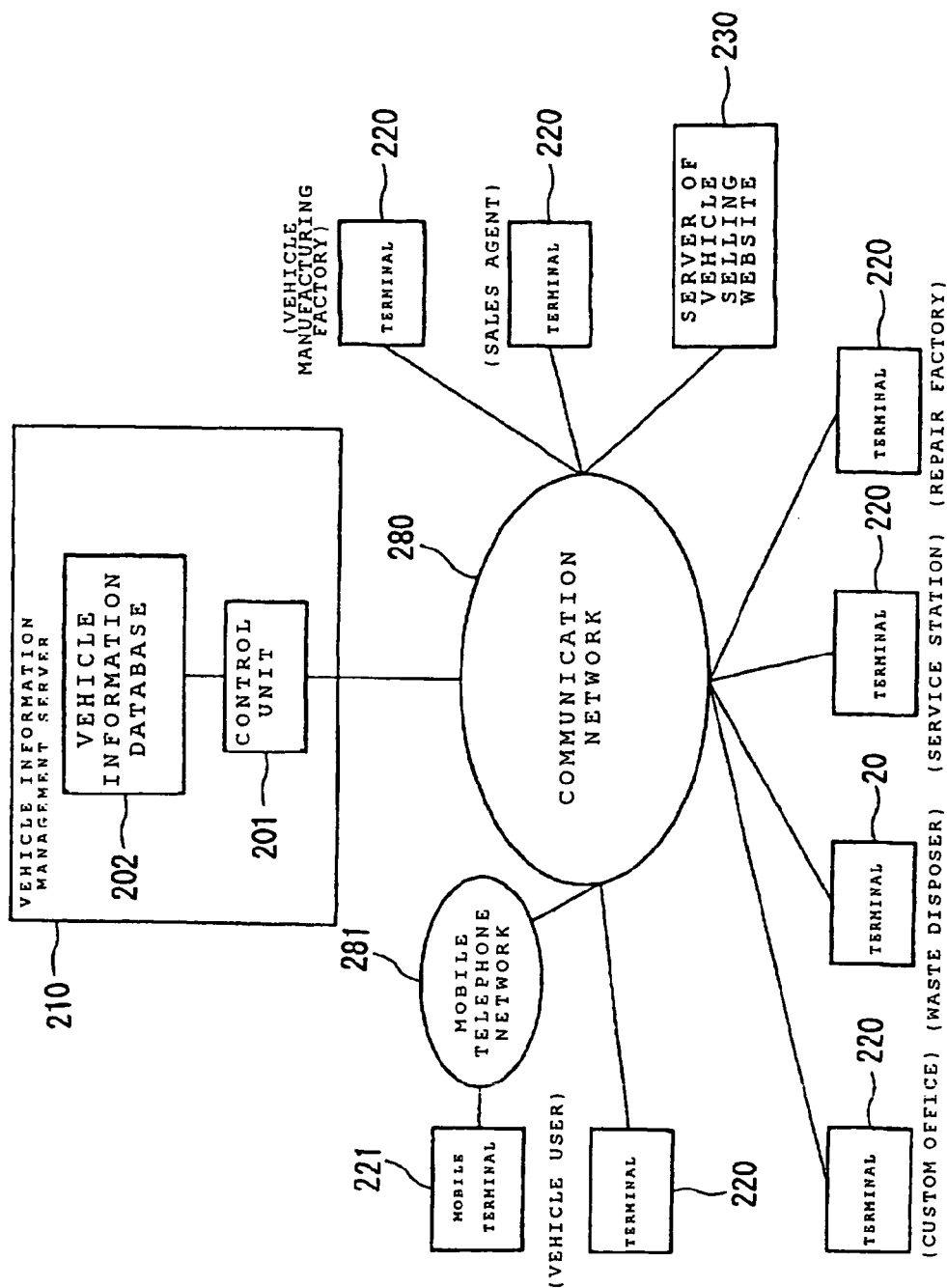
FIG. 9 is a block diagram of a vehicle management system according to a fourth embodiment of the present invention.

FIG. 9 is a block diagram showing a configuration of the vehicle management system according to this embodiment.

In FIG. 9, a vehicle information management server 210 is provided that includes a control unit 201 (identification means, information output means, object of arrangement identification information storage means, comparative means, owner information extracting means, waste product management sheet issuing means, throwaway information output means) and vehicle information database 202 (article information storage means, article configuration information storage means, owner information storage means, waste product processing information storage means). Terminals 220 are provided, respectively, for vehicle manufacturing factories, vehicle sales agencies, vehicle repair factories, service stations, vehicle disposal agencies, custom offices, or residences of the vehicle user. The IC tag reading/writing devices (tag information reading means) are connected to the terminals 220 as needed, so that information in the memory in the IC tag provided on the vehicle or information in the memory in the IC tag embedded as a vehicle registration certificate can be read and written. The disposal agencies includes discharge agencies that discharge waste products, collecting and transporting agencies that collect and transport the discharged waste product, intermediate treatment agencies that perform intermediate treatment or the waste products, and final treatment agencies that perform final treatment after the intermediate treatment, and so on. Mobile terminals 221 are provided that are carried by the users of the vehicles. Servers 230 of vehicle selling websites use a so-called web-interface via a communication network.

A communication network 280 is provided wherein the vehicle information management server 210, the terminals 220, the mobile terminals 221 and the servers 230 of the vehicle selling websites can communicate with each other via the communication network 280. The mobile terminal 221 can be connected to the communication network 280 via the mobile telephone network 281. The mobile telephone network 281 and the communication network 280 are connected via a gateway device or the like, not shown.

In the vehicle information management server 210, the vehicle information database 202 includes management information for the respective vehicles regarding the entire lifecycles of the vehicles from a stage of being shipped from the factories to a stage of being discarded. As will be described later, the control unit 201 makes reference to data stored in the vehicle information database 202 or write data in the vehicle information database 202 while exchanging data with the terminals 220, the mobile terminals 221, or the servers 230 of the vehicle selling websites.

Computers are utilized for the vehicle information control server 210, the terminals 220, and the severs 230 of the websites for selling the vehicles. The mobile terminals 221 include terminals of mobile phones (mobile telephone terminal or PHS (registered trademark, Personal Handy Phone System) terminal) or PDA (Personal Digital Assistant), and so on. These devices include CPUs (Central Processing Unit) therein. The processes performed by these devices are stored in computer readable recording media in a form of a computer program, and the processes are performed by the CPUs that read and execute the programs. The computer readable recording media here includes magnetic disks, magnetic optical disks, CD-ROMs, DVD-ROMs, and semiconductor memories. It is also possible to adapt in such a manner that the computer program is distributed to a computer via the communication line. In addition, the CPU is provided in the computer that receives the computer program and executes the distributed program.

Subsequently, means for identifying the individual vehicle with this system will be described. The vehicle is provided with an IC tag which can be identified by the vehicle ID. An IC tag 72 includes a semiconductor memory integrated therein, and the semiconductor memory includes both a non-rewritable area and a rewritable area. The non-rewritable area includes at least the vehicle ID for identifying the vehicle in advance.

The mounting position of the IC tag 72 can be provided in the seat, for example, in the vehicles (motorcycles, four-wheelers, bicycles, personal watercrafts (PWC), four-wheeler buggies). Since the seat is formed of resin member that transmits electromagnetic waves, mounting of the IC tub in the seat is convenient for reading or writing the information stored in the IC tag using electromagnetic wave signals. Since the saddle-type vehicle normally does not have a metallic roof for covering over the seat, IC tag reading/writing devices can be conveniently installed above spots where the vehicles may stop, for example, in the service stations, the repair factories, or on the road. The IC tag is adapted to be secured to the vehicle from the manufacture to the disposal thereof. Thus, mounting the IC tag in the seat has an advantage such that the IC tag cannot easily be detached.

In the case of vehicles having metallic roofs such as passenger cars, buses, or auto trucks, writing and reading of information in the IC tag are performed by mounting the IC tag in the seat and bringing the handy-type reading/writing device into the interior of the vehicle. Alternatively, the IC tag is mounted in the vicinity of the front window or the rear window of the passenger car. For example, it is possible to mount the IC tag to a dashboard part and read and write the IC tag from outside of the vehicle from above. It is also possible to mount the IC tag in the resin member that constitutes the dashboard part.

Figure 10:
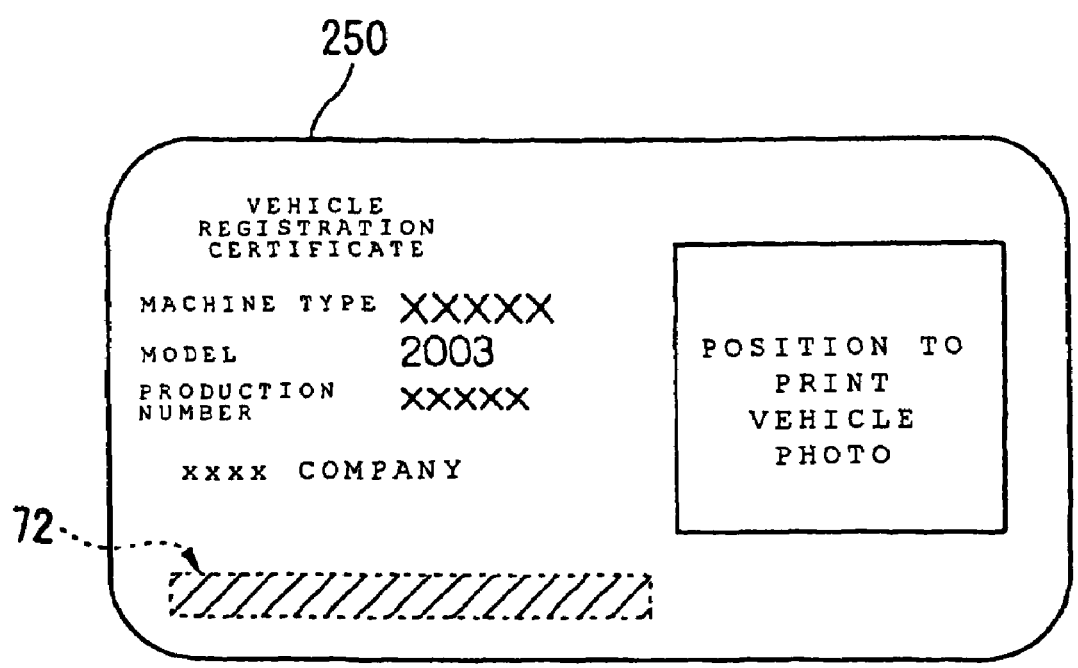
FIG. 10 is a schematic drawing of a vehicle registration certificate.

Subsequently, the vehicle registration certificate used in this system will be described. FIG. 10 is a schematic drawing showing an example of the surface of the vehicle registration certificate. In this drawing, a vehicle registration certificate 250 is a certificate which is issued one per vehicle, and includes, as shown in the drawing, the type and the model year (displayed as "Model 2003") of the object vehicle, the production number, and the name of manufacturer are stated on the front surface thereof, and a photo of the vehicle is printed or adhered thereon. An IC tag 72 is provided which is embedded in the vehicle registration certificate 250. A semiconductor memory is integrated in the IC tag 72, and both of the non-rewritable area and the rewritable area exist in the semiconductor memory.

The vehicle registration certificate is issued by a public organization or the like that controls the manufacturers that manufacture vehicles and vehicle registrations. The dimensions of the vehicle registration certificate are, for example, 5.3 cm in the vertical direction and 8.5 cm in the horizontal direction, which is similar to the size of a credit card. The material of the vehicle registration certificate may be plastic or the like.

Figure 11:
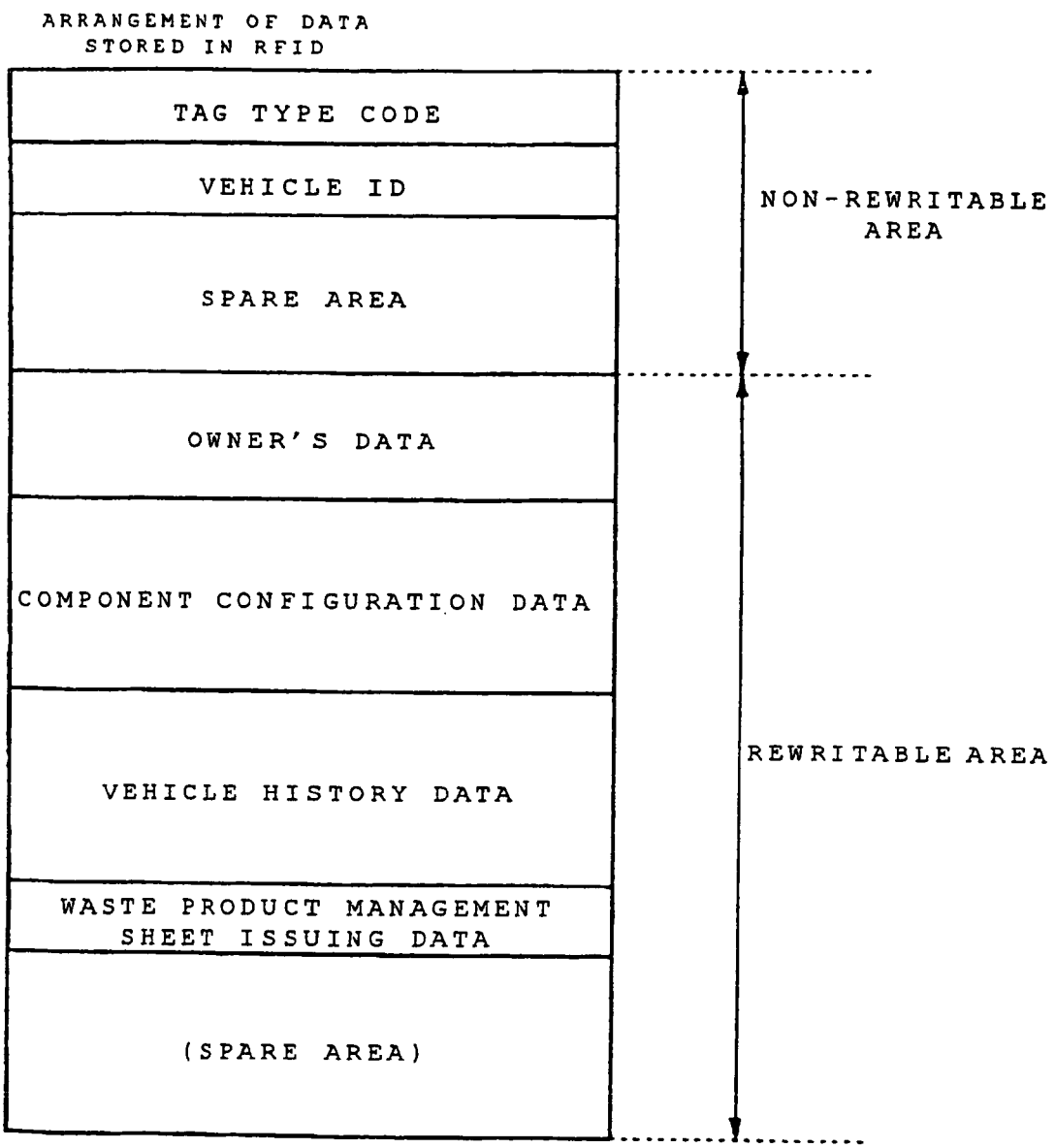
FIG. 11 is a block diagram of data stored in a memory in the IC tag.

Subsequently, the IC tag provided in the vehicle and information stored in the IC tag 72 which is embedded in the vehicle registration certificate 250 will be described. FIG. 11 is a schematic drawing showing a configuration of data stored in the memory in the IC tag. As shown in the drawing, a non-rewritable area and a rewritable area exist in the memory. The non-rewritable area is realized by using, for example, a ROM (read only memory). Alternatively, data in the non-rewritable area is protected from being rewritten by a control function of the IC tag.

The non-rewritable area includes a tag type code and a vehicle ID stored therein, and is provided with a spare area. The tag type code is code information for determining whether the IC tag in question is the IC tag which is provided on the vehicle or the IC tag which is provided on the vehicle registration certificate. The vehicle ID is code information for identifying the vehicle independently.

The rewritable area includes owner data, component configuration data, vehicle history data and waste product management sheet issuing data stored therein and includes a spare area. The owner data, the component configuration data, the vehicle history data and the waste product management sheet issuing data are also stored in the vehicle information database 202 as the same information and controlled as described later. In this system, since the vehicle management sever 210 and the terminals 220 are in communication via the communication network 280, data stored in the vehicle information database 202 (the owner data, the component configuration data, the vehicle history data and the waste product management sheet issuing data) and data stored in the IC tag (the owner data, the component configuration data, the vehicle history data and the waste product management sheet issuing data) are synchronously renewed as needed. Since the storage capacity of the IC tag is limited, it is also possible to store a full set of data in the vehicle information database 202 and store only subsets of the respective data in the IC tag.

Referring now to FIG. 12 to FIG. 15, the respective data stored in the vehicle information database 202 will be described. The data shown in FIG. 12 to FIG. 15 are stored partly or entirely in the IC tag for each vehicle.

FIG. 12 is a schematic drawing showing a data structure of owner data contained in the vehicle information database. As shown in the drawing, the owner data includes owner information corresponding to the vehicle ID. The owner information includes name, date of birth, address, and so on.

Figure 13:
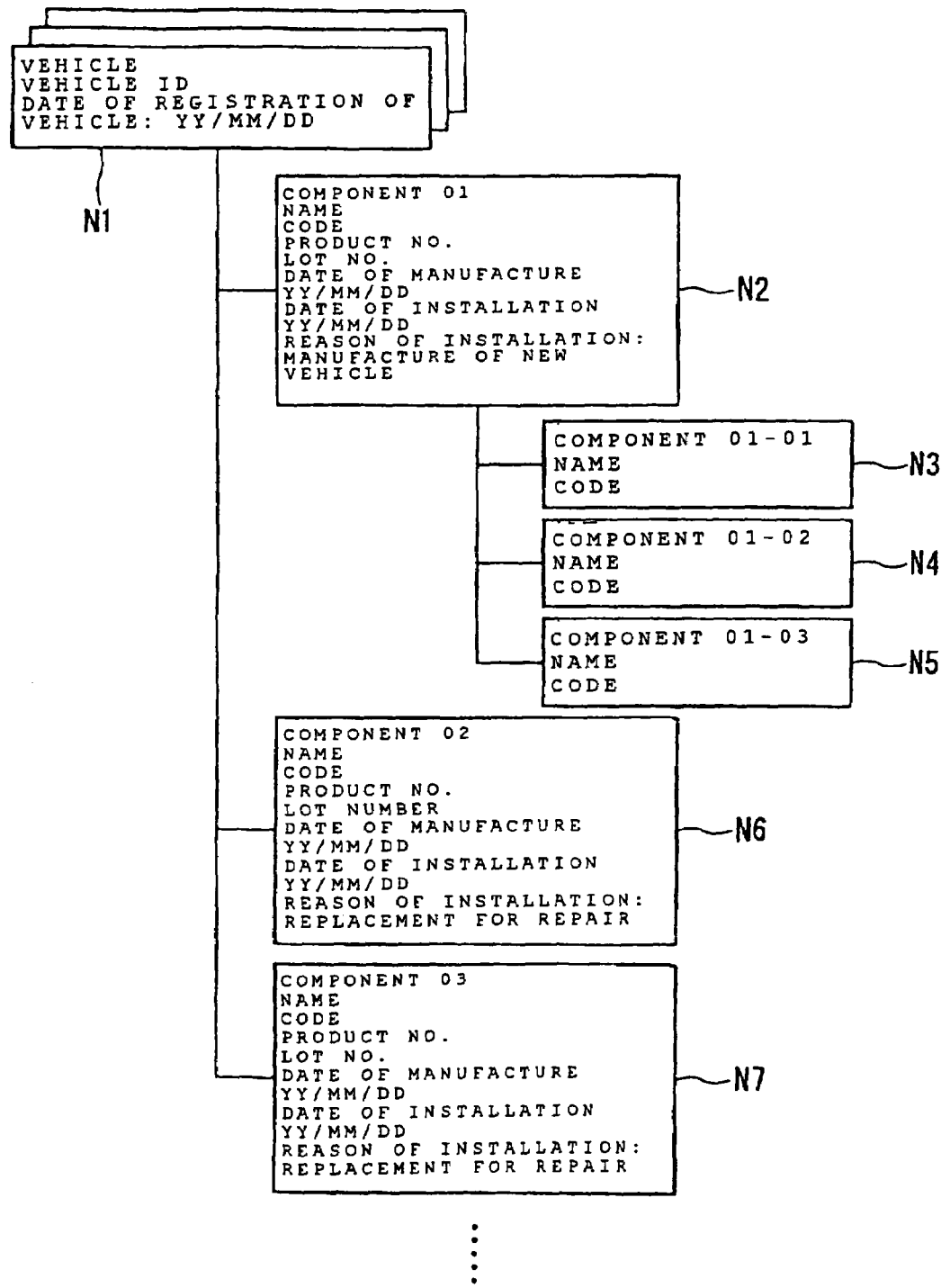
FIG. 13 is a drawing showing a data structure of component configuration data.

FIG. 13 is a schematic drawing showing a data structure of component configuration data contained in the vehicle information database. As in the example shown in the drawing, the component configuration data includes information about the component configuration for each vehicle (for each vehicle ID) as tree-structure data, and reference signs N1 to N7 designate nodes in this tree structure. The node N1 corresponds to the vehicle, and includes data items such as the vehicle ID and the data of vehicle registration. This vehicle is composed of a component 01, a component 02, a component 03, . . . , and information about these components are stored in the node N2, the node N6 and the node N7. The configuration of the components is hierarchical. For example, the component 01 is composed of a component 01-01, a component 01-02, a component 01-03, . . . , and information about these components are stored in the node N3, the node N4, and the node N5. The nodes N2 to N7 each includes data items such as a name representing the denomination of the component, a component code for identifying the type of the component, a component product number allocated for each component, a component lot number representing the production lot of the component, a date of manufacture of the component representing the date when the component is manufactured, an installation date of the component representing the date when the component is mounted to the vehicle or mounted to a higher component and a reason for installation of the component representing the reason why the component is mounted (such as "manufacture of a new vehicle" or "replacement for repair").

In FIG. 13, illustrates a case wherein two hierarchies are shown as an example. However, the number of hierarchies is not limited.

FIG. 14 is a schematic drawing showing a data structure of the vehicle history data contained in the vehicle information database. As in the example shown in the drawing, the vehicle history data includes historical information for each vehicle (for each vehicle ID), and includes at least items such as the date, the general history, and detailed history. Values of items of the general history includes, for example, "manufacture of a new vehicle," "registration of owner," "change of owner," "fueling," "repair," "deletion of registration," "issue of waste product management sheet," and so on. The historical information is generated at the terminal 220 every time when the event occurs. The information is written in the IC tag provided on the vehicle or the IC tag of the vehicle registration certificate as needed, and is transmitted from the terminal 220 to the control unit 201. The control unit 201 performs the step of writing or entering data into the database on the basis of the transmitted information.

When the general history is "manufacturing of a new vehicle," the name of manufacturer and the name of factory are written as the detailed data. When the general history is "registration of the owner," the name of the owner and the address of the owner are written as the detailed data. When the general history is "fueling," information that specifies the service station, and information about the amount of fuel and the distance recorder at the time of fueling are written as the detailed data. When the general history is "repair," information about the name of factory that the vehicle is repaired or the contents of repairing work are written as the detailed data. When the general history is "change of the owner," the name of a new owner and the address of the new owner are written as the detailed data.

FIG. 15 schematically shows the waste product management sheet issuing data contained in the vehicle information database. As in an example shown in the drawing, the waste product management sheet issuing data includes data items such as a waste product management sheet issued flag, a waste product treatment code, information about the discharge agencies, information about the collecting and transporting agencies, information about the intermediate treatment agencies, information about the final treatment agencies, public keys of the discharge agencies, public keys of the collecting and transporting agencies, public keys of the intermediate treatment agencies, and public keys of the final treatment agencies. The waste product management sheet issued flag is information representing whether the waste product management sheet (manifest) is already issued or not. The waste product treatment code is information representing whether the waste product management sheet is issued in a form of paper document or in a form of electronic data. The secret keys which correspond to the respective public keys are possessed by the computers of the respective agencies. The agencies of the respective stages (for example, the intermediate treatment agency) may be a plurality of agencies depending on the contents of treatment, and in this case, the public key information for the respective agencies is stored in the waste product management sheet issuing data.

Figure 16:
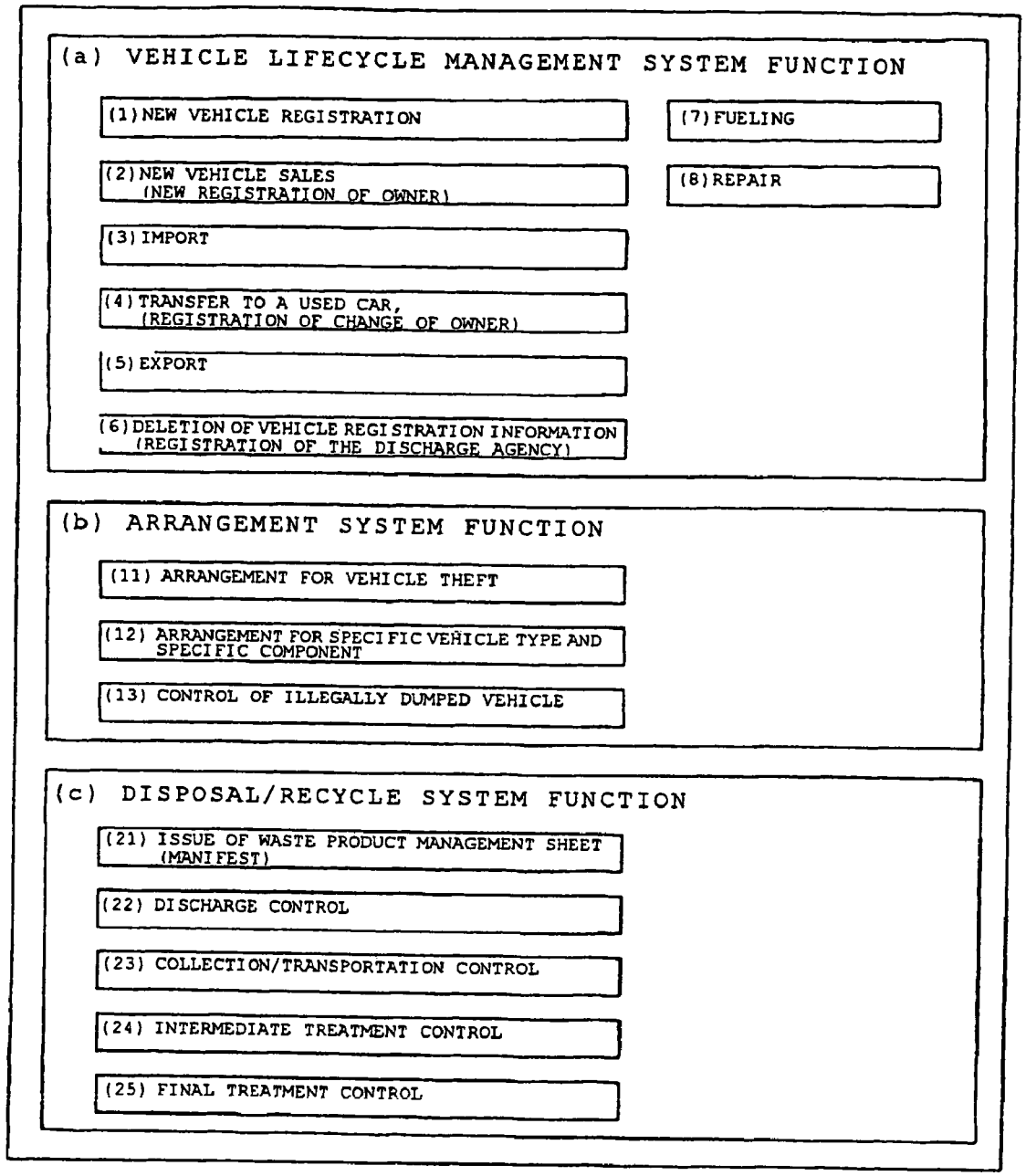
FIG. 16 is a list of function of a control unit of a vehicle information management server.

FIG. 16 is a schematic drawing showing a list of functions of the control unit 201 in the vehicle information management server 210. As shown in the drawing, in this embodiment, the control unit 201 roughly includes a vehicle lifecycle management system function (a), an arrangement system function (b), and a disposal/recycle system function (c).

More specifically, the vehicle lifecycle management system function includes the functions of (1) new vehicle registration, (2) new vehicle sales (new registration of an owner), (3) import, (4) transfer to a used car, (registration of change of owner), (5) export, (6) deletion of vehicle registration information (registration of the discharge agency), (7) fueling, and (8) repair. The arrangement system function includes the functions of (11) arrangement for vehicle theft, (12) arrangement for specific vehicle type and specific component, and (13) control of illegally dumped vehicle. The disposal/recycle system function includes functions of (21) issue of waste product management sheet (manifest), (22) discharge control, (23) collection/transportation control, (24) intermediate treatment control, and (25) final treatment control. The respective functions will generally be described below.

The new vehicle registration function receives the vehicle ID, the component configuration data of the new vehicle, and so on from the terminals 220 such as the vehicle manufacturing factory and registers the data of the new vehicle to the vehicle information database 202. At this time, information to be written into the IC tag to be provided on the vehicle or the IC tag to be embedded in the vehicle registration certificate is simultaneously generated.

(2) The new vehicle sales (new registration of the owner) function receives data of the owner such as the name and the address from the terminal 220 of the sales agent or the server 230 of the vehicle selling website, and registers the owner data in the vehicle information data-base 202.

(3) The import function performs the same processing as the transfer to a used car, which will be described later, in the case in which the vehicle is imported from counties (areas) to be controlled by the vehicle management system. When the vehicle is imported from other countries (areas), this function registers the owner data or the component configuration data as a new vehicle, and registers the past history information as the vehicle history data. The function required for processing of the import function is received, for example, from the terminal 220 of the custom office.

(4) The transfer to a used car (registration of change of the owner) function receives data of the new owner such as the name and the address from the terminal 220 of the used car sales agent or the like, registers data on the new owner in the vehicle information database 202, and adds the vehicle history data.

(5) The export function performs the same processing as the transfer to a used car, described above, in the case in which the vehicle is exported to countries (areas) to be controlled by the vehicle management system. When the vehicle is exported to other countries (areas), this function renews or deletes the owner data and adds the export record as the vehicle history data. The function required for processing of the export function is received, for example, from the terminal 220 of the custom office.

(6) The deletion of vehicle registration information (registration of the discharge agency) function adds information representing the deletion of registration as the vehicle history data and registers the discharge agency, which is a first agency that gets a contract of waste treatment into the vehicle information database 202.

(7) The fueling function receives data (information about the fueling amount, information about the distance recorder, information about the fueling site, and so on) relating to the fueling from the terminal 220 in the service station, and registers the received data as the vehicle history data.

(8) The repair function receives data on the repair from the terminal 220 in the repair factory, and registers the received data as the vehicle history data. When replacement of components or the like is performed during the repair, the component configuration data of the vehicle information database is renewed.

(11) The arrangement for vehicle theft function makes an arrangement for theft using the vehicle ID when a theft of the vehicle has occurred. The information about a theft is transmitted to the terminals 220 in the custom office, the repair factories, and the service stations. For example, in the service station, a facility to read the vehicle ID from the IC tag provided on the vehicle at a position where the vehicle stops for fueling is provided so that the vehicle ID read from the IC tag of the vehicle and the vehicle ID in the information about the arrangement for the theft can be compared. It may be adapted to stop fuel supply automatically when both IDs match as a result of a comparison and send the information about the location of the service station to the vehicle information management server. Accordingly, the whereabouts of the stolen vehicle can be determined relatively easily.

(12) Is an arrangement to identify a specific vehicle type and specific component function, for example, when the lifetime of a component of a specific lot is on its last legs. The vehicle is specified wherein the component in question is identified by searching the component configuration data in the vehicle information database 202 for obtaining the ownership data of the vehicle. Accordingly, an invitation of component replacement or the like can be supplied to the owner. It is also possible to include the history of compulsory vehicle inspection or history of replacement of the components such as a tire, or history of maintenance or inspection in part of the vehicle history data, and send the invitation for the subsequent compulsory vehicle inspection, replacement of the components or regular inspections when the predetermined term has elapsed since the compulsory automobile inspection, replacement of components, or inspection of the previous time on the basis of the vehicle history data. Such invitations may be sent by mail to the address of the owner, or may be sent by e-mail to the e-mail address, which is stored as ownership data. In addition, in the case in which the lifetime of the component is on its last legs, for example, when the component includes controlling means composed of software integrated therein, an invitation for an additional function of the software can be sent to the owner.

(13) The control of an illegally dumping vehicle functions to output information about the vehicle which is illegally dumped. For example, when the vehicle which is illegally dumped is discovered, the vehicle ID is read from the IC tag provided on the vehicle by using the handy terminal device or the like (portable type terminal device) at the dumped site. Then, the control unit 201 reads the vehicle history data or the ownership data of the vehicle in question from the vehicle information database 202 on the basis of the vehicle ID. If the registration of the vehicle is already deleted, and the vehicle is in the course of the disposal, the state of the waste treatment is followed on the basis of the data written in the vehicle information database 202 from the function of the disposal/recycle system, described later.

Figure 17:
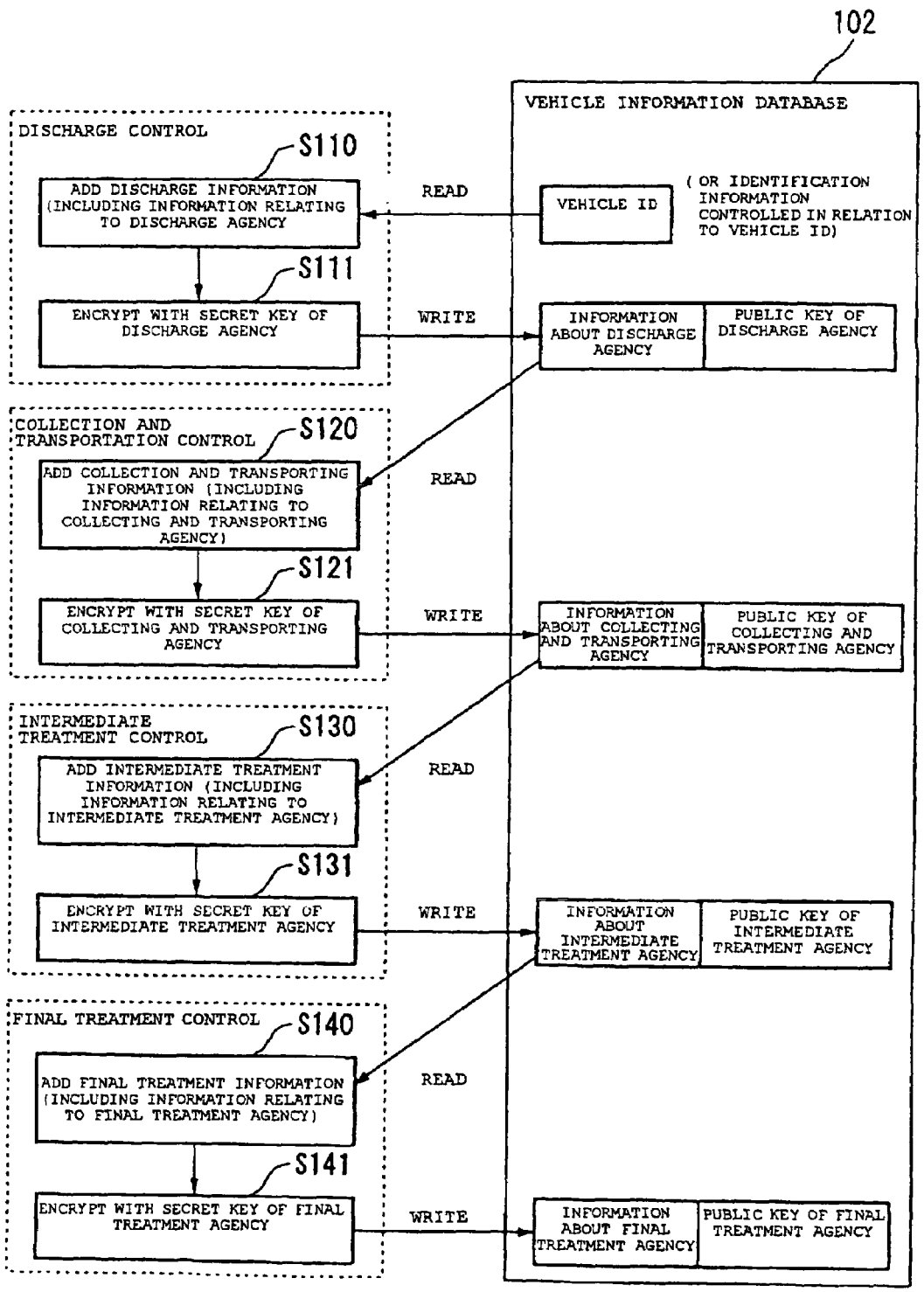
FIG. 17 is a flowchart of treatment and data in a disposal/recycle system function.

Subsequently, the disposal/recycle system function will be described. FIG. 17 is a schematic drawing showing a flow of process and data in the disposal/recycle system function. In FIG. 17, the discharge control, the collection and transportation control, the intermediate treatment control, and the final treatment control are functions of the control unit 201. The treatment shown in FIG. 17 is performed on the premise that the electronic waste product management sheet is already issued. In other words, when deletion of the vehicle registration information is performed, the waste product management sheet is issued in association therewith, and the waste product management sheet (waste product management sheet data) as the electronic data is recorded to the vehicle information database 202. The waste product management sheet data contains the vehicle ID and the waste product management sheet data and other data in the vehicle information database related to each other by the vehicle ID. Instead of storing the waste product management sheet data in the vehicle information database 202, it is also possible to store in other storage areas in the vehicle information management server 210 or in a recording media (not shown) such as a magnetic disk in another computer.

Referring to the flow chart in FIG. 17, the discharge control function that the control unit 201 has reads the vehicle ID of the vehicle to be discarded from the vehicle information database 202, and adds the discharge information (including information relating to the discharge agency) (Step S110). The information including the vehicle ID and the discharge information is sent to the terminal 220 of the discharge agency via the communication network 280, and asks for encryption. The discharge agency encrypts the information with the secret key of the discharge agency, and then returns the same to the discharge control function of the control unit 201. The discharge control function writes the returned information after encryption in the vehicle information database 202 as the discharge agency information, and writes the public key of the discharge agency in the vehicle information database 202 (Step S111).

Subsequently, the collection and transportation controlling function of the control unit 201 reads information about the discharge agency from the vehicle information database 202, and adds the collecting and transportation information (including the information relating to the collecting and transporting agency) (Step S120). Then, the collection and transportation controlling function transmits the information after the addition to the terminal 220 of the collecting and transporting agency via the communication network 280, and asks for encryption. The collecting and transporting agency encrypts the information with the secret key of the collecting and transporting agency and returns the same to the collection and transportation controlling function of the control unit 201. The collection and transportation controlling function writes the returned information after encryption in the vehicle information database 202 as the information about the collecting and transporting agency, and writes the public key of the collecting and transporting agency in the vehicle information database 202 (Step S121).

Subsequently, the intermediate treatment control function of the control unit 201 reads the information about the correcting and transporting agency from the vehicle information database 202, and adds the intermediate processing information (including information about the intermediate treatment agency) (Step S130). Then, the intermediate treatment control function transmits the information after addition to the terminal 220 of the intermediate treatment agency via the communication network 280 and asks for encryption. The intermediate treatment agency encrypts the information with the secret key of the intermediate treatment agency and returns the same to the intermediate treatment control function of the control unit 201. The intermediate treatment control function writes the returned information after encryption in the vehicle information database 202 as the information about the intermediate treatment agency and writes the public key of the intermediate treatment agency in the vehicle information database 202 (Step S131).

Subsequently, the final treatment control function of the control unit 201 reads the information about the intermediate treatment agency from the vehicle information database 202, and adds the final treatment information (including the information about the final treatment agency) (Step S140). Then, the final treatment control function transmits the information after the addition to the terminal 220 of the final treatment agency via the communication network 280 and asks for encryption. The final treatment agency encrypts the information with the secret key of the final treatment agency and returns the same to the final treatment control function of the control unit 201. The final treatment control function writes the returned information after encryption in the vehicle information database 202 as the information about the final treatment agency, and writes the public key of the final treatment agency in the vehicle information database 202 (Step S141).

As described above, by performing the processes from Step S110 to Step S141 according to the respective stages of the waste treatment, and controlling the information about the waste product, the information about the state of waste treatment can be controlled uniformly. Since this information is encrypted by the secret keys of the respective agencies, it is reliably guaranteed to be the information added by the agency in question by decoding by using the corresponding public key. Thus, information sufficient for accurately following the waste treatment process can be retained in the vehicle information database. The information about the waste treatment is related to the vehicle ID of the vehicle in question, and the vehicle ID corresponds to the vehicle ID written in the IC tag provided on the vehicle registration certificate or the vehicle itself. Therefore, the individual vehicle which is an object of treatment as a waste product can be identified reliably.

In the example shown in FIG. 17, the process is preformed in the order of the discharge agency, the collecting and transporting agency, the intermediate treatment agency, and the final treatment agency as a premise. However, the process does not have necessarily to be performed in this order, and what is essential is to encrypt and add the information about the agencies of the disposal/recycle system step-by-step. For example, it is also possible that a single agency performs, for example, both the collection and transportation, and the intermediate treatment together, or the intermediate treatment is performed by a plurality of agencies in a plurality of steps, or the treatment agencies are classified according to the material that constitutes the waste product.

The above-described vehicle information management server 210, the terminals 220, the mobile terminal 221, and the servers 230 for the vehicle selling website each include a computer system therein. The process of each treatment in the above-described vehicle information management is stored in the computer readable recording medium in a form of a program, and the treatments described above are performed by the computer by reading the program. The computer readable recording medium here includes magnetic disks, magnetic optical disks, CD-ROMs, DVD-ROMs, and semiconductor memories. It is also possible to distribute the computer program to the computer by the communication line, so that the computer that receives the program executes the program.

Although the embodiment of the present invention has been described referring to the drawings, the detailed structure is not limited to these embodiments, and designs within a range that do not depart from the scope of the invention are also included.

EXAMPLE 5

Referring now to the drawings, a fifth embodiment of the present invention will be described. The statement of front, rear, left and right in the following description correspond to those in the vehicle.

Figure 18:
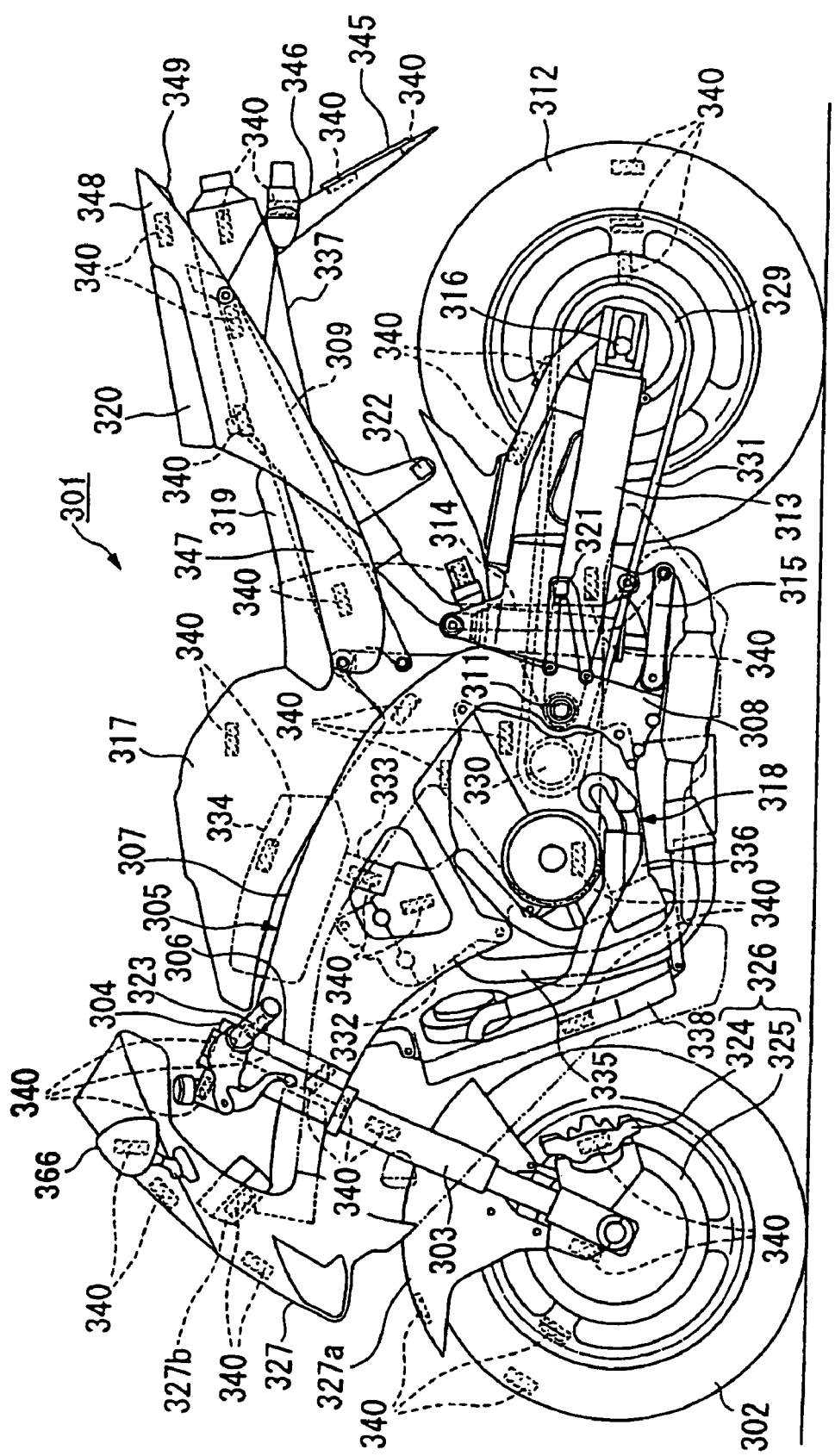
FIG. 18 is a side view of a motorcycle according to a fifth embodiment of the present invention when viewed from the left side.

FIG. 18 shows a motorcycle 301 to which the IC tag mounting structure according to the present invention is applied. As shown in the drawing, a front fork 303 that supports a front wheel 302 of the motorcycle 301 about an axis is steerably supported by a head pipe 306 provided at a front end portion of a vehicle body frame 305 via a steering stem 304. A main frame 307 of the vehicle body frame 305 extends obliquely downwardly and rearwardly from the head pipe 306, and a rear end portion thereof is bent downwardly and is connected to a pivot plate 308. A front end portion of a seat frame 309 extending obliquely upwardly and rearwardly is connected to a rear portion of the main frame 307.

A proximal portion of a swing arm 313 is swingably mounted to the pivot plate 308 via a pivot shaft 311 with a rear wheel 312 being supported at a distal end portion of the swing arm 313 about an axis. An upper end portion of a shock absorber unit 314 is mounted to an upper portion of the swing arm 313 on the proximal side, and a lower end portion of the shock absorber unit 314 is connected to the pivot plate 308 via a link mechanism 315 at a position lower than the pivot shaft 311.

A fuel tank 317 is mounted above the main frame 307, and a water-cooled inline four-cylinder engine 318 is mounted below the main frame 307, respectively. A rider's seat 319 and a pillion seat 320 for a passenger on a rear seat are provided rearwardly of the fuel tank 317. A rider's step 321 is mounted to a rear portion of the pivot plate 308, and a step 322 for the passenger on the rear seat is mounted to a lower portion of the seat frame 309.

A handle 323 is mounted to an upper end portion of the front fork 303. A front disk brake 326 of the motorcycle 301 includes a brake caliper 324 mounted to a lower end portion of the front fork 303 and a break disk 325 corresponding to the brake caliper 324 mounted to a hub portion of the front wheel 302. A rear disk brake having the same configuration as the front disk brake 326 is provided on a right side of the rear wheel 312.

A front portion of the vehicle body of the motorcycle 301 is covered by a front cowl 327, and both sides below the seat 319 are covered by side covers 347. A peripheral portion of the seat frame 309 is covered by a tail cowl 348. A driven sprocket 329 is mounted to a left side of the rear wheel 312 with a drive chain 331 being wound around the driven sprocket 329 and a drive sprocket 330 arranged on a left side of a rear portion of the engine 318, so that a drive force of the engine 318 is transmitted to the rear wheel 312.

Fuel supply devices (throttle bodies) 333 corresponding to the respective cylinders are connected to a rear portion of a cylinder section 332 of the engine 318 with the respective fuel supply devices 333 being connected to an air cleaner box 334 arranged between the main frame 307 and the fuel tank 317. Exhaust pipes 335 corresponding to the respective cylinders are connected to a front portion of the cylinder section 332. The exhaust pipes 335 are curved downwardly from a front wall portion of the cylinder section 332 and are passed below a crankcase 336 and are bent upwardly behind the pivot plate 308 and are connected to a muffler 337 supported by the seat frame 309. A radiator 338 for cooling the engine 318 is disposed forwardly of the exhaust pipes 335.

Figure 19:
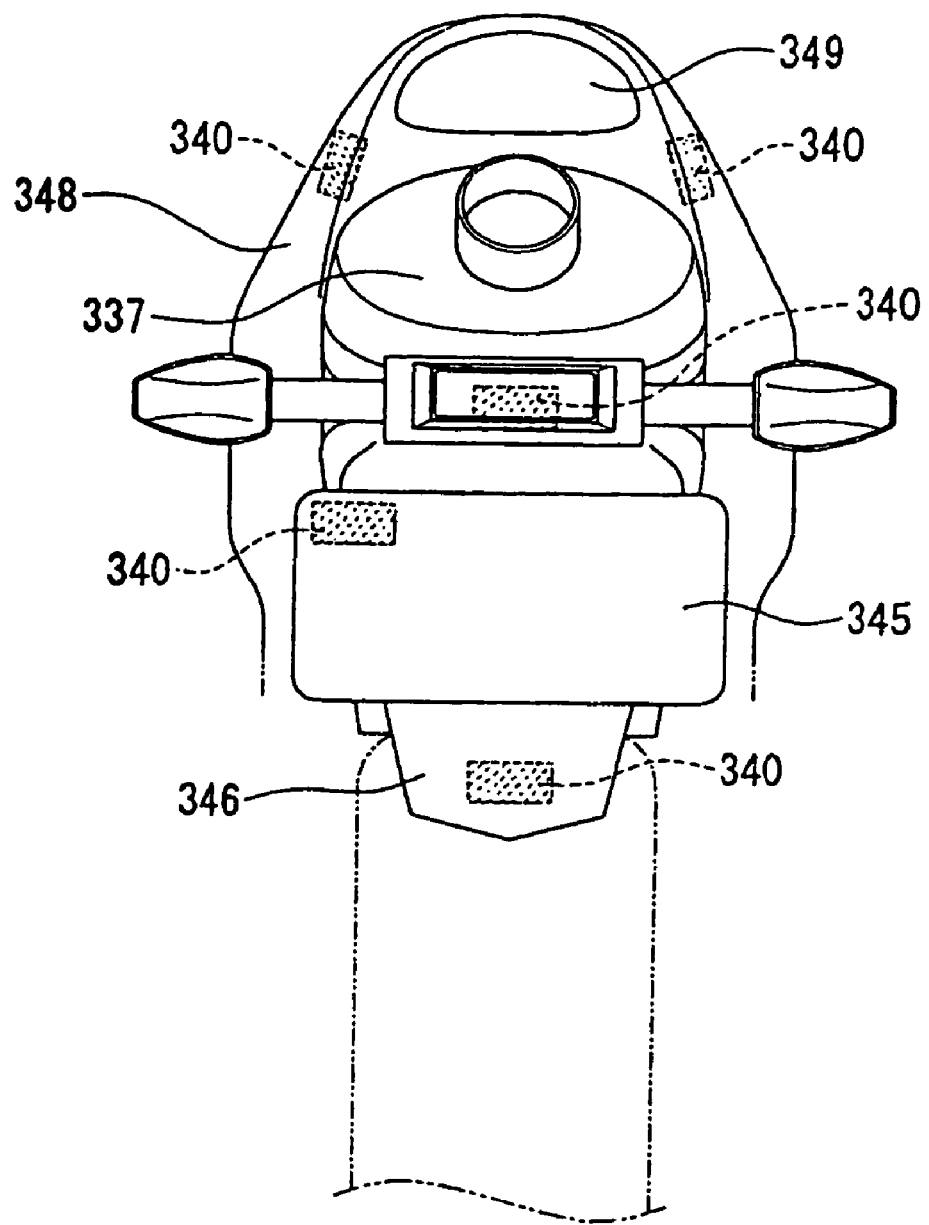
FIG. 19 is a rear view of the motorcycle.

FIG. 19 is a drawing of the vehicle body of the motorcycle 301 viewed from the rear. The muffler 337 of a center-up type is arranged exactly below a tail lamp 349. A rear fender 346 and a license plate 345 are arranged below the muffler 337. An IC tag 340 is arranged on the license plate 345 or in the periphery thereof, and is arranged between the high-frequency (RF, wireless) reader and the IC tag 340 at a position having no obstacle for reading and writing. By arranging the IC tag 340 at such a position, a transmission signal from the reader located apart from the motorcycle 301 can be supplied easily to the IC tag 340. Even when the IC tag 340 is arranged on a tail cowl 348 or the rear fender 346, the same effects can be achieved as long as it is in the vicinity of the license plate 345.

Figure 20A:
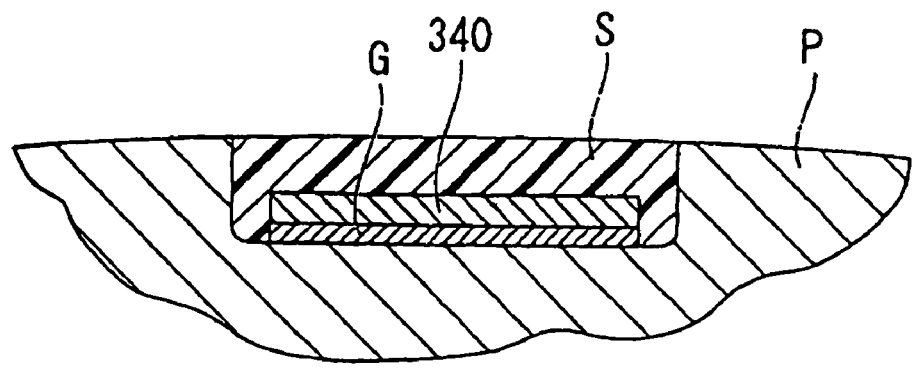
FIG. 20(a) is a cross-sectional view of a component in which the IC tag is resin-encapsulated.
Figure 20B:
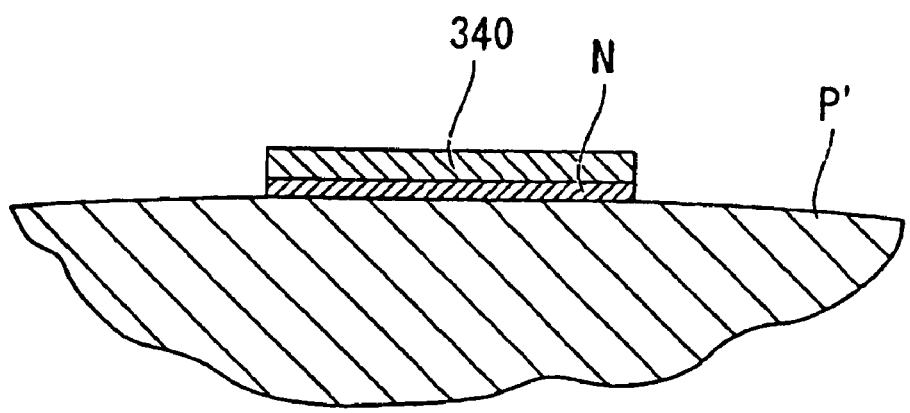
FIG. 20(b) is a cross-sectional view of a component on which the IC tag is adhered.
Figure 20C:
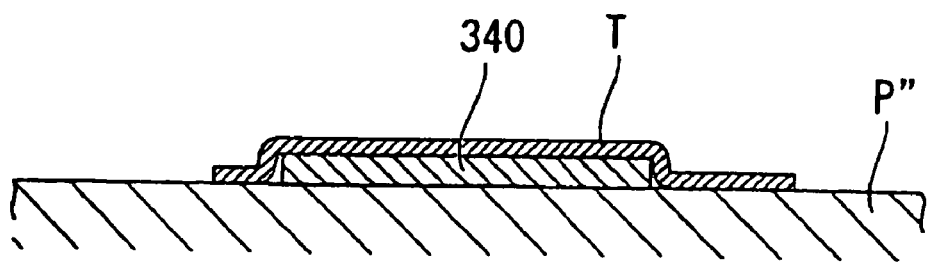
FIG. 20(c) is a cross-sectional view of a component in which the IC tag is arranged under the adhered member.

When mounting the IC tag 340 to those components, when the component is a resin molding such as an exterior component or the like, the IC tag 340 can be molded integrally by inserting the same during molding. On the other hand, when the IC tag mounting component is a cast molding of aluminum or iron such as the engine system component or the like, as shown in FIG. 20(*a*), a recess 340*a* corresponding to the IC tag 340 is provided on an outer surface of the component P in question, the IC tag 340 is arranged in the recess, adhesive resin S is filled therein so as to cover the IC tag 340 entirely and the resin is hardened so that the IC tag 340 is integrally encapsulated in the component. Reference sign G in the drawing represents a high permeability magnetic material such as glass epoxy or the like.

In this arrangement, since resin normally does not affect the radio wave of the IC tag 340 very much, reading and writing signals with respect to the IC tag 340 are transmitted through the encapsulated resin to maintain a favorable communicating state. In addition, the IC tag 340 can be reliably secured. In addition, the IC tag 340 is protected from separation or damage by an external cause, or mischief by a third party. Even when the component P is formed of metal, since the high permeability magnetic material is arranged below the IC tag 340, the reflected wave of radio wave from the IC tag 340 is restrained. Thus, a favorable communicating state is maintained.

When the IC tag mounting component is a processed part of a steel plate such as a pressed component, it is also possible to adhere the IC tag 340 integrally on an outer surface of the component P' in question with an adhesive layer N such as an adhesive agent, a double-sided adhesive tape or the like. Furthermore, as shown in FIG. 20(*c*), the IC tag 340 may be mounted to a component P'' by an affixture T, such as a sticker, label or the like. The IC tag 340 may be arranged under the affixture and then adhered integrally on an outer surface of the component together.

Referring also to FIG. 18, examples in which the IC tag 340 is provided on the respective components of the motorcycle 301 will be described in sequence.

FIGS. 21(*a*), 21(*b*) show an example, in which the IC tag 340 is provided on an outer surface of an outer wall portion of a cam chain chamber 351 on one side of a cylinder 332*a* of the cylinder section 332, which is a main functional component of the engine 318 of the motorcycle 301.

The cam chain chamber 351 is also used as a passage for engine oil in the cylinder section 332 when returning to the crankcase 336, and an outer wall portion thereof is apart from an inner wall of the cylinder. Therefore, a favorable cooling capability is achieved, and the cam chain chamber 351 is hardly affected by heat from the engine. Thus, the durability or reliability of the IC tag 340 can be improved. Since the IC tag 340 is positioned on an outer side surface of the cylinder 332*a*, it is advantageous also for communication. If the IC tag 340 is positioned on an intake side (IN side in the drawing) in the cylinder 332*a*, an arrangement which is further advantageous in terms of heat is achieved. For convenience of illustration, the cylinder 332*a* in FIG. 21 is differentiated from that in the motorcycle 301.

FIGS. 22(*a*) and 22(*b*) show an example in which the IC tag 340 is mounted to an outer surface of an outer wall of a cam chain chamber 352 on one side of a cylinder head 332*b* of the cylinder section 332, which is a main component of the engine 318 of the motorcycle 301.

In this arrangement, as described above, the IC tag 340 may be favorable in its cooling capability and hardly affected by the heat from the engine. Thus, an advantage for communications is achieved. At this time, if the IC tag 340 is positioned on the intake side (IN side in the drawing) in the cylinder head 332*b*, an arrangement which is further advantageous in terms of heat is achieved. For convenience of illustration, the cylinder head 332*b* in FIG. 22 is differentiated from the one in the motorcycle 301.

Figure 23B:
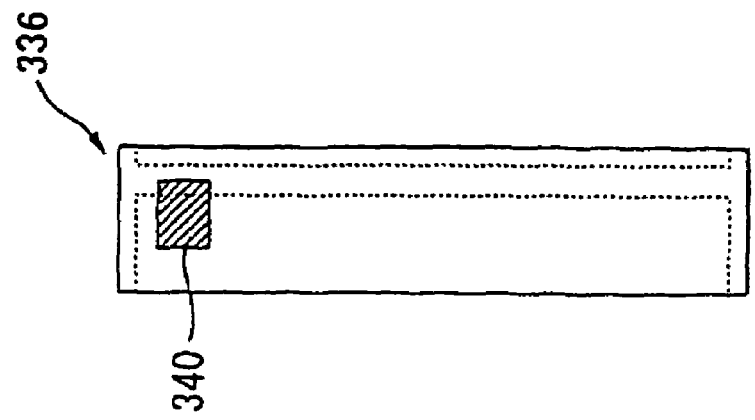
FIG. 23(b) is a rear view of the crankcase.
Figure 23A:
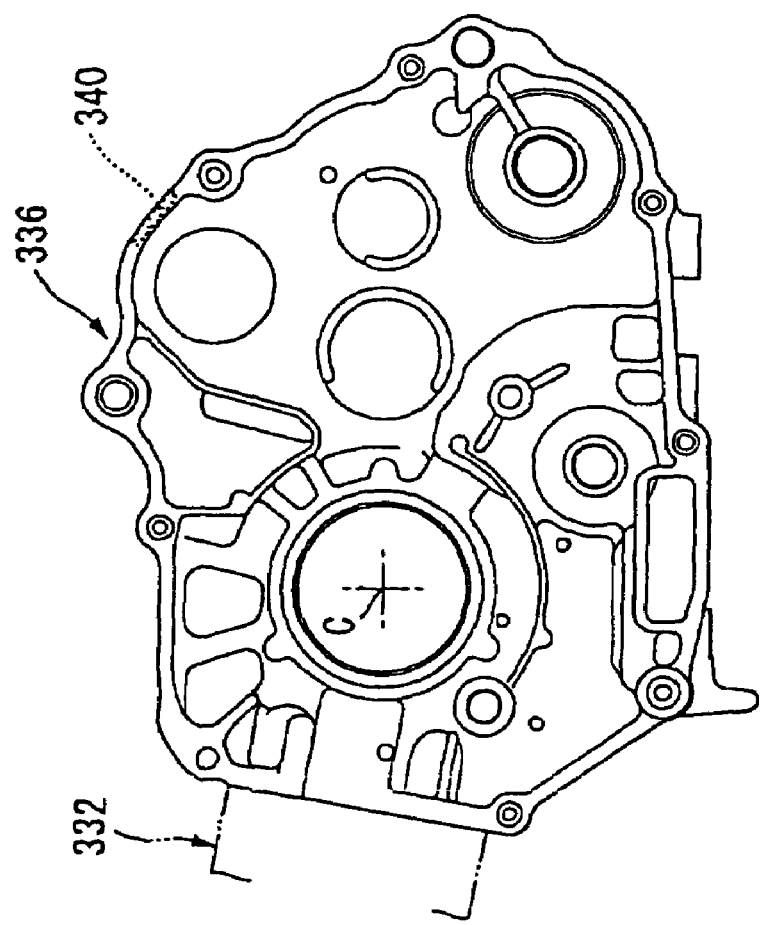
FIG. 23(a) is a side view of a crankcase as the engine system component.

FIGS. 23(*a*) and 23(*b*) show an example in which the IC tag 340 is provided on an upper surface of an upper wall portion of the crankcase 336, which is a main functional component of the engine 318 of the motorcycle 301.

In this configuration, an arrangement advantageous for communication in comparison with the case in which the IC tag 340 is provided on a lower wall portion of the crankcase 336 is achieved. Also, in comparison with the case in which the IC tag 340 is provided on a sidewall portion of the crankcase 336, it is hardly affected by external causes such as contact or collision with the outside. Thus, it is hardly noticed by a third party. Consequently, it is hardly affected by mischief. Thus, the durability or the reliability of the IC tag 340 is improved. At this time, if the IC tag 340 is positioned on a rear side of the crankcase 336 so as to be apart from the cylinder section 332, an arrangement which is advantageous in terms of heat is achieved. For convenience of illustration, the crankcase 336 in FIG. 23 is differentiated from the one in the motorcycle 301, and reference sign C in the drawing represents an axis of the crankshaft.

FIGS. 24 (*a*) and 24(*b*) show an example in which the IC tag 340 is provided on an outer surface of a piston wall portion 353*b* of a piston 353, which is a main functional component (internal component) of the engine 318 of the motorcycle 301, which substantially intersects with a piston pin 353*a*.

In this configuration, in comparison with the case in which the IC tag 340 is provided on a skirt portion 353*c* located on both sides of the piston wall portion 353*b*, the IC tag 340 is hardly affected by friction or the like with respect to the inner wall of the cylinder due to an inclination of the piston 353 about the piston pin 353*a*. Thus, an arrangement which is advantageous for the IC tag 340 is achieved. At this time, if the IC tag 340 is positioned on the intake side (IN side in the drawing) of the piston 353, an arrangement which is advantageous in terms of heat is achieved.

FIGS. 25(*a*) and 25(*b*) show an example in which the IC tag 340 is provided on a side surface of an arm portion 354*c* of a connecting rod 354, which is a main functional component (internal component) of the engine 318 of the motorcycle 301, between a small end portion 354*a* and a large end portion 354*b*.

The arm portion 354*c* is thinned on both side surfaces, and a bottom surface of the thinned portion is used as a printing surface for component identification and also used as a surface for installing the IC tag 340. In other words, the IC tag 340 can hardly receive a load from the piston or the crankshaft, and the IC tag 340 can easily be provided and identified. Thus, an arrangement favorable for the IC tag 340 is achieved.

FIGS. 26 (*a*), 26(*b*) and 26(*c*) show an example in which the IC tag 340 is provided on a crankshaft 355, which is a main functional component (internal component) of the engine 318 of the motorcycle 301 on an inner side surface of a crank web 355*a* on a crankpin 355*b* side or on an outer side surface of a journal 355*c* side.

An inner side surface of the crank web 355*a*, which is the connecting rod side, has a wide surface area for installing the IC tag 340 since the crank pin 355*b* is deviated. Thus, flexibility in the layout design of the IC tag 340 is increased. On the other hand, an outer surface side of the crank web 355*a* is hardly affected by a disturbance from the rotating connecting rod. Thus, an arrangement which is favorable for the IC tag 340 is achieved.

Figure 27:
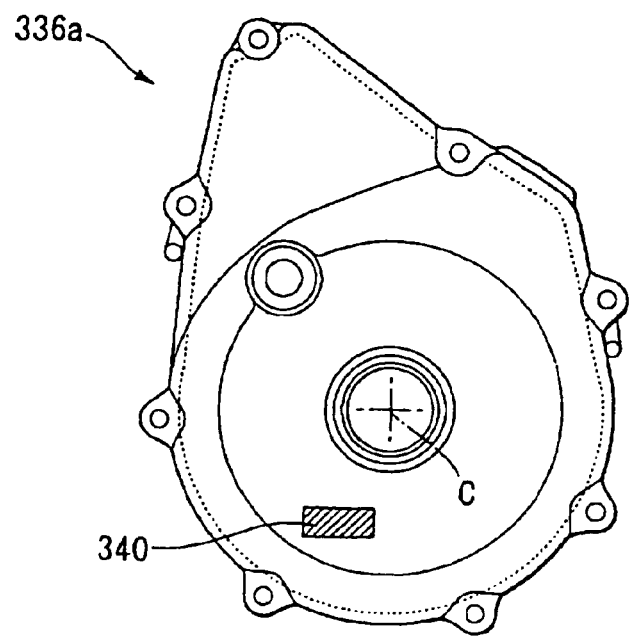
FIG. 27 is a side view of a drive sprocket cover of the engine.

FIG. 27 shows an example in which the IC tag 340 is provided on an outer side surface of a drive sprocket cover 330a that is mounted to a left side of a rear portion of the crankcase 336 of the engine 318 of the motorcycle 301.

The drive sprocket cover 330a covers a periphery of the drive sprocket 330 from the side and has a wide surface area for installing the IC tag 340. Thus, the flexibility of the layout design is increased. The drive sprocket cover 330a has the wide surface area for installing the IC tag 340, while it is disadvantageous in terms of restraining the rotating noise of the sprocket and noise of the chain. However, by increasing the strength of the wide surface area portion by installing the IC tag 340, an improvement of the noise attenuating effect is expected. In addition, if the drive sprocket cover 330a is a resin mold or a die-cast product, the IC tag 340 can be easily be provided integrally by insert or resin encapsulation.

Figure 28:
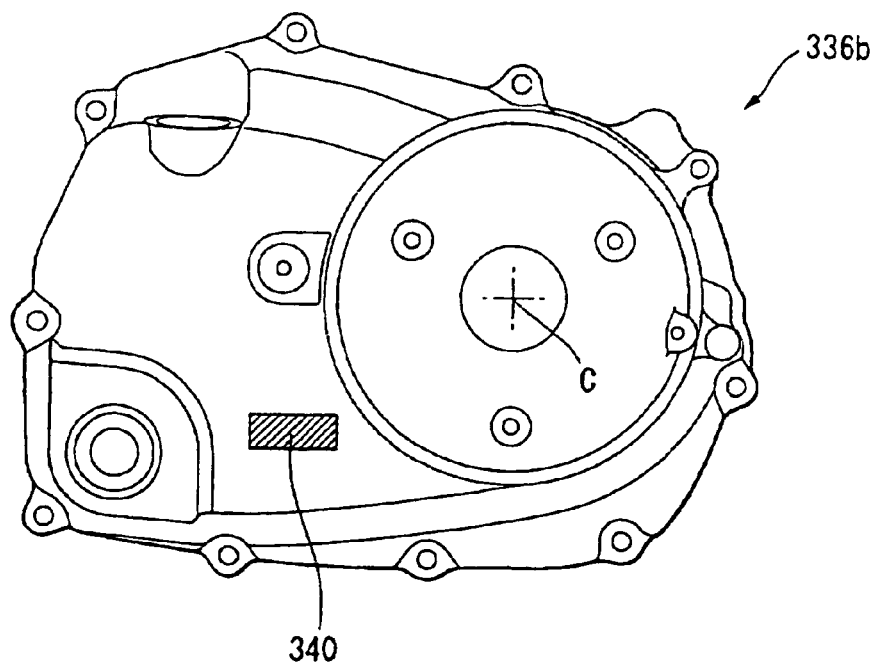
FIG. 28 is a side view of a crankcase left cover of the engine.

FIG. 28 shows an example in which the IC tag 340 is provided on an outer side surface of a crankcase left cover 336a that is to be mounted to the left side of the crankcase 336 of the engine 318 of the motorcycle 301.

The crankcase left cover 336a covers the periphery of a left end of the crankshaft from the side, and has a wide surface area for installing the IC tag 340. Thus, the flexibility in the layout design of the IC tag 340 is increased. In the crankcase left cover 336a, by increasing the strength of the wide surface area portion on which the IC tag 340 can be installed by installing the IC tag 340, an improvement of the noise attenuating effect against the rotating noise of the crankshaft or the like is achieved. In addition, if the crankcase left cover 336a is a resin mold or a die-cast product, the IC tag 340 can be easily be provided integrally by insert or resin encapsulation. The reference sign C in the drawing designates an axis of the crankshaft.

FIG. 29 shows an example in which the IC tag 340 is provided on an outer side surface of a crankcase right cover 336b to be mounted to a right side of the crankcase 336 of the engine 318 of the motorcycle 301.

The crankcase right cover 336b covers a periphery of a right end of the crankshaft from the side, and has a large surface area for installing the IC tag 340, and hence the flexibility in the layout design of the IC tag 340 is increased. In the crankcase right cover 336b, by increasing the strength of the wide surface area portion on which the IC tag 340 can be installed by installing the IC tag 340, an improvement of the noise attenuating effect against the rotating noise of the crankshaft or the like is achieved. In addition, if the crankcase right cover 336b is a resin mold or a die-cast product, the IC tag 340 can be provided integrally with further easiness by insert or resin encapsulation. Reference sign C in the drawing designates the axis of the crankshaft.

FIGS. 30(a), 30(b) show an example in which the IC tag 340 is provided on an outer surface of a body 333a of the fuel supply device 333 (for convenience of illustration, the fuel supply device in FIG. 30 is a carburetor), which is an air-inlet system component of the engine 318 of the motorcycle 301. The reference sign EN side in the drawing designates the engine side (front side), and the reference signs AC side designates the air cleaner side (rear side).

The body 333a is, for example, an aluminum die-cast product, and is provided with a throttle drum 333b that is a processed part of a steel plate engaged with an accelerator wire, for example, a left wall portion thereof. On the other hand, a right wall portion of the body 333a is provided with a choke mechanism 333c engaged with a choke wire. A throttle sensor 333d is provided.

The IC tag 340 is provided on a front wall portion of the body 333a on the engine side. Since the diameter of an air outlet port is normally reduced in comparison with an air inlet port, the surface area where the IC tag 340 can be installed is large. Thus, flexibility in the layout design is increased. On the other hand, when the IC tag 340 is provided on a rear wall portion of the body 333a, the IC tag 340 comes apart from the engine 318. Thus, an arrangement which is advantageous in terms of heat is achieved. When the IC tag 340 is provided on the right wall portion of the body 333a, since the IC tag 340 is located on an outer side surface of the body, communication is advantageous. In addition, since the IC tag 340 is located on the side opposite from the throttle drum 333b that is made of steel, a further favorable communication is achieved. Since the fuel supply device 333 of the motorcycle 301 is a throttle body, the same effects and advantages can be achieved in the case in which the above-described configuration is applied thereto.

Figure 31:
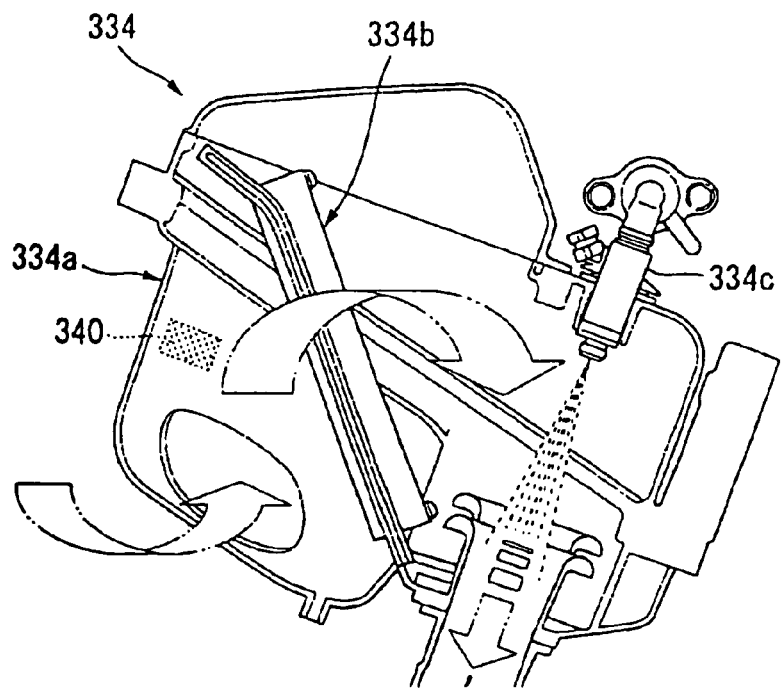
FIG. 31 is an explanatory cross-sectional view of an air cleaner box as the engine air-inlet system component.

FIG. 31 shows an example in which the IC tag 340 is provided on a casing 334a of the air cleaner box 334, which is an air-inlet system component of the engine 318 of the motorcycle 301.

The casing 334a has a sufficiently wide surface area in which the IC tag 340 can be installed. Thus, the flexibility in the layout design is significantly increased. At this time, by providing the IC tag 340 on an upstream side of an air cleaner element 334b in the casing 334a, it is located apart from the engine 318. Thus, an arrangement which is advantageous in terms of heat is achieved. In addition, the IC tag 340 is favorably cooled by intake air (air flow). If the casing 334a is a resin mold, the IC tag 340 can easily be provided integrally with further by insert. An arrow in chain line in FIG. 31 represents a flow of intake air. An injector 334c is installed in the casing.

Figure 32:
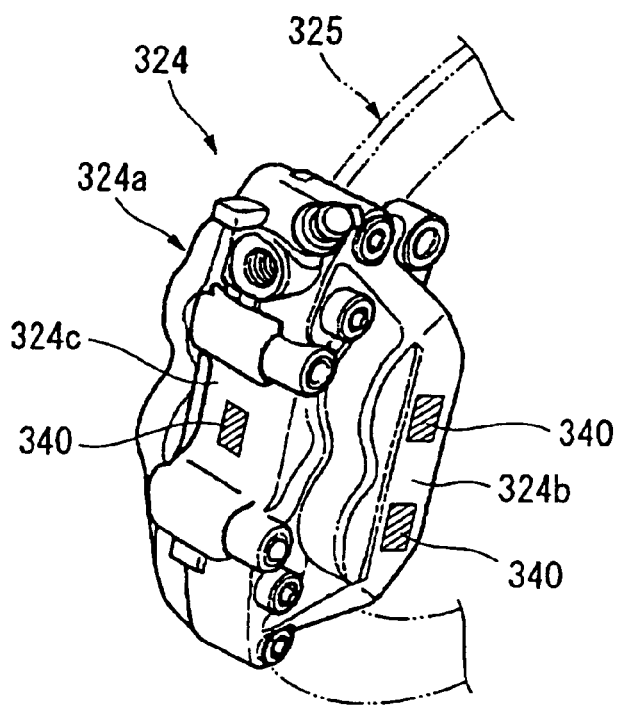
FIG. 32 is a perspective view of a brake caliper as a brake system component.

FIG. 32 shows an example in which the IC tag 340 is provided on an outer surface of a caliper body 324a of the brake caliper 324 as a brake system component of the motorcycle 301.

The caliper body 324a is, for example, an aluminum die-cast product, and a bridge portion 324c which extends across a cylinder outside portion 324b or the brake disk 325 has a large area for installing the IC tag 340. Thus, the flexibility in the layout design of the IC tag 340 is increased and an arrangement which is advantageous for communication is achieved by utilizing the outside portion 324b or the bridge portion 324c. Since it is an important security component, and hence the user rarely does maintenance on this component directly, an arrangement which is favorable for the IC tag 340 is achieved. Whether the brake caliper 324 is for a front brake or for a rear brake, or whether it is of an opposed piston type or of a floating type are not important.

Figure 33A:
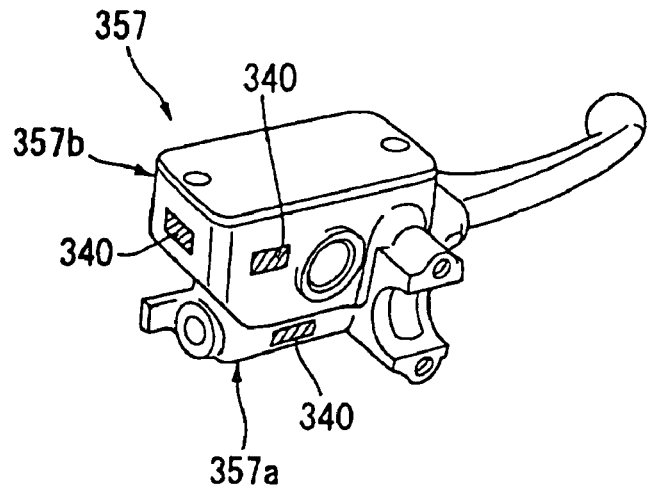
FIG. 33(a) is a perspective view of a front brake master cylinder as the brake system component.

FIG. 33(a) shows an example in which the IC tag 340 is provided on an outer surface of a body 357a or a brake reservoir tank 357b of a front brake master cylinder 357, which is a brake system component of the motorcycle 301.

The body 357a and the brake reservoir tank 357b are, for example, an aluminum die-cast product formed integrally with each other. Since these members are normally exposed to the appearance of the vehicle, the provision of the IC tag 340 on either one of them is advantageous for communication. In addition, since these members are important security components, the user rarely does maintenance on these components directly. Thus, an arrangement which is favorable for the IC tag 340 is achieved. Even when the front brake master cylinder 357 and the brake reservoir tank 357b are separate members, the same advantages and effects as described above are achieved.

Figure 33B:
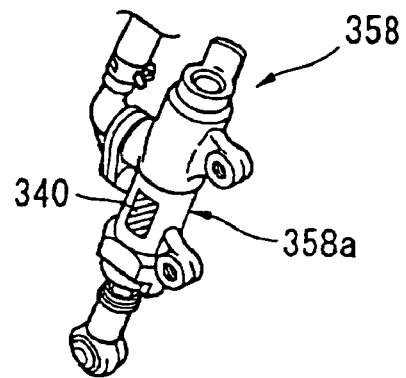
FIG. 33(b) is a perspective view of a rear brake master cylinder also as the brake system component.

FIG. 33(b) shows an example in which the IC tag 340 is provided on an outer surface of a body 358a of a rear brake master cylinder 358, which is also a brake system component of the motorcycle 301.

In this case as well, an arrangement which is advantageous for communication of the IC tag 340 is achieved, and since it is an important security component, the user rarely does maintenance on this component directly. Thus, an arrangement which is favorable for the IC tag 340 is achieved. Whether or not the brake reservoir tank is integral is not important also in the case of the rear brake master cylinder 358.

Figure 34:
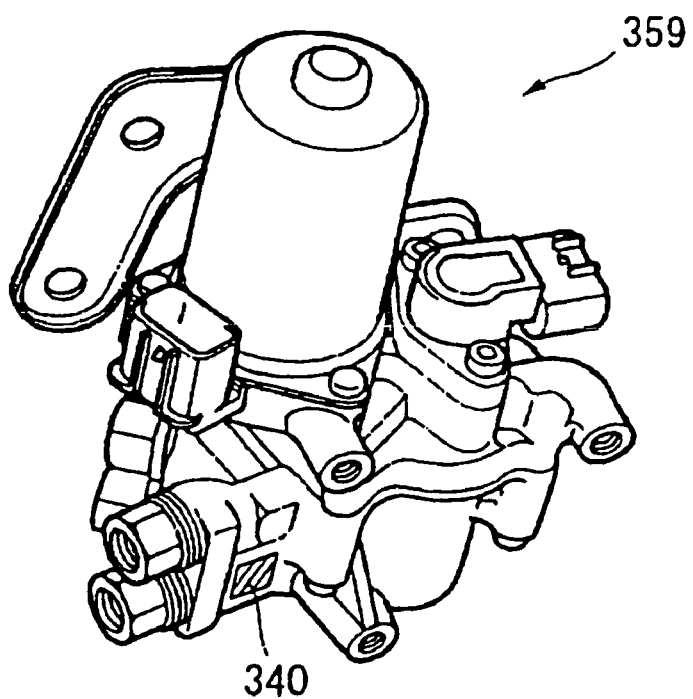
FIG. 34 is a perspective view of an ABS modulator as the brake system component.

FIG. 34 shows an example in which the IC tag 340 is provided on an outer surface of a body of an ABS (anti-lock brake system) modulator (brake pressure increase and decrease device) 359, which is a brake system component of the motorcycle 301.

Since the ABS modulator 359 is provided in the interior of the vehicle body in many cases, and the user rarely does maintenance on this component directly, an arrangement which is very favorable for the IC tag 340 is achieved.

Figure 35:
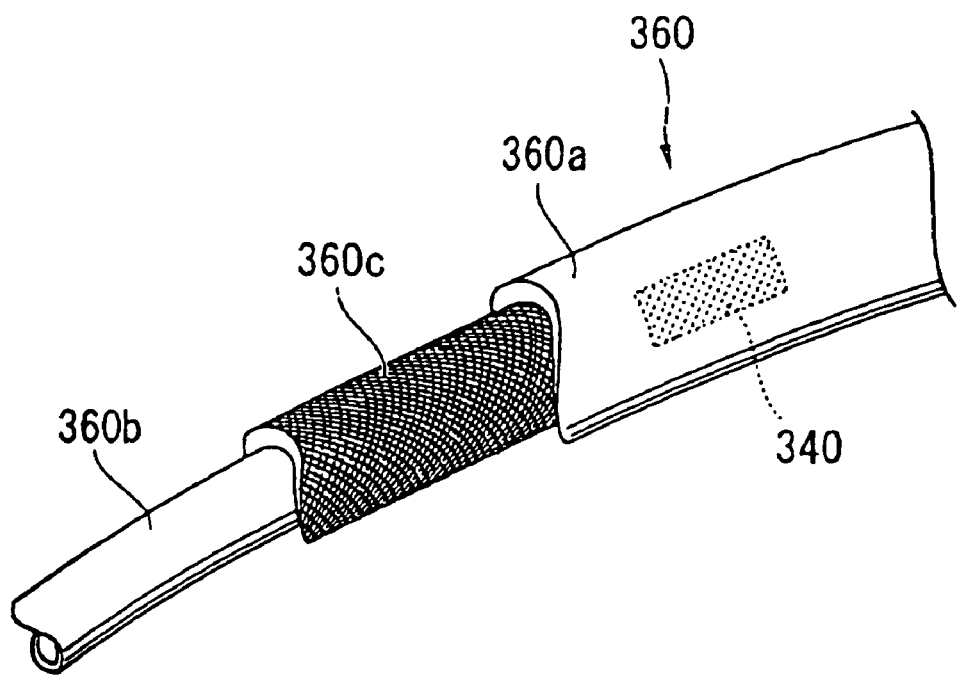
FIG. 35 is an explanatory perspective view showing a structure of a brake hose as the brake system component.

FIG. 35 shows an example in which the IC tag 340 is provided on a brake hose 360, which is a brake system component of the motorcycle 301 between the inner and outer layers thereof.

The brake hose 360 includes a reinforcing layer 360c knit up with fibers of polyester or the like between inner and outer rubber layers 360a, 360b. The IC 340 can be installed at an arbitrary position in the longitudinal direction of the brake hose 360 by weaving the IC tag 340 together with the reinforcing layer 360c between the inner and outer layers 360a, 360b, so that flexibility in the layout design is increased. Simultaneously, the existence thereof can hardly be noticed by a third party. Thus, the effect of an individual's mischief can be effectively prevented. The above-described brake hoses 360 may be of a low expansion type with the inner layer formed of PTFE (Polytetrafluoroethylene) and the outer layer formed of stainless wire braiding.

Figure 36:
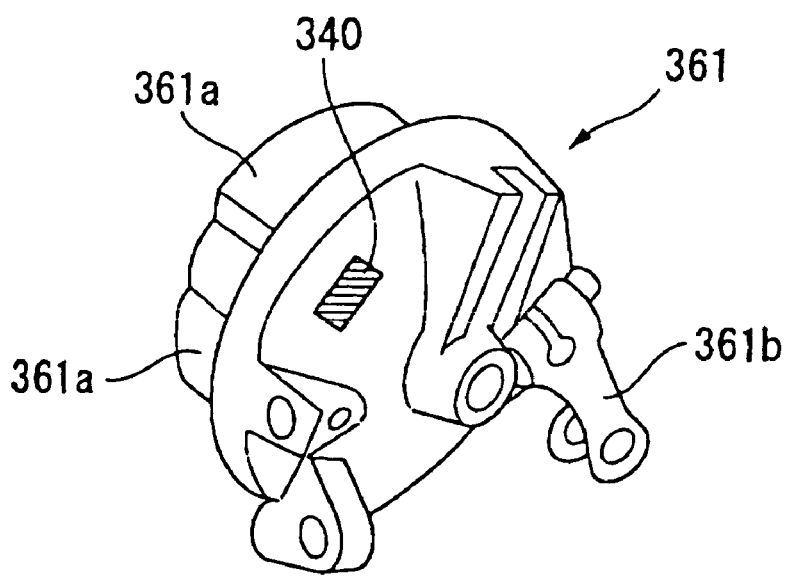
FIG. 36 is a perspective view of a brake panel as the brake system component.

FIG. 36 shows an example in which the IC tag 340 is provided on an outside of a brake panel (back plate) 361, which is a brake system component, in a case in which the motorcycle 301 is provided with a drum brake.

The brake panel 361 is normally a die-case product for holding, for example, a pair of brake shoes 361a so as to be capable of opening. An outer side surface has a wide surface area for installing the IC tag 340. Therefore, the flexibility in the layout design is increased and an arrangement which is advantageous for communication is achieved. A brake arm 361b is provided for opening the brake shoes 361a in conjunction with the brake operator.

Figure 37:
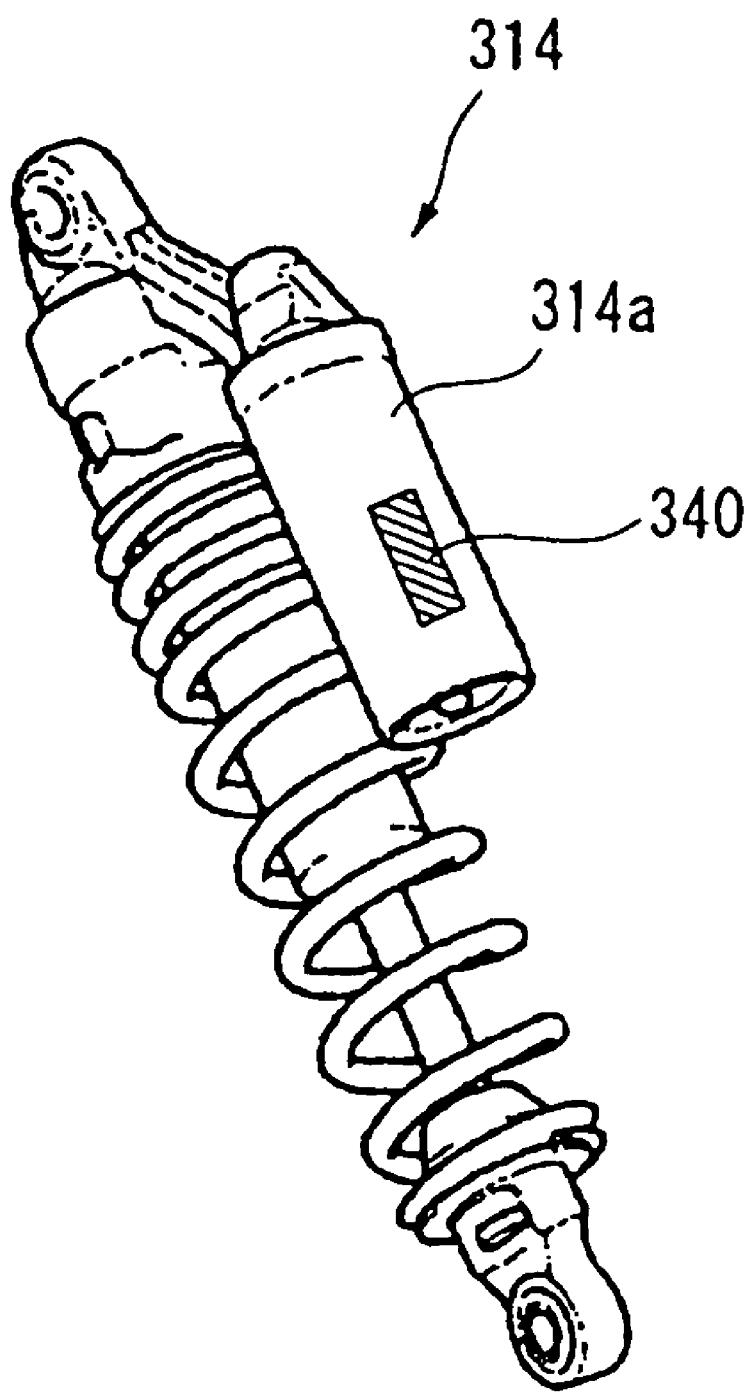
FIG. 37 is a perspective view of a shock absorber unit as a rear wheel suspension system component.

FIG. 37 shows an example in which the IC tag 340 is provided on an outer surface of a shock absorber reservoir tank 314a of the shock absorber unit 314, which is a rear wheel suspension system component of the motorcycle 301.

In this case, the surface area for installing the IC tag 340 is wide. Thus, flexibility in the layout design is increased. If the shock absorber reservoir tank 314a is a die-cast product, a recess for encapsulating the IC tag 340 can be easily formed. Thus, the IC tag 340 can be easily integrated.

Figure 38A:
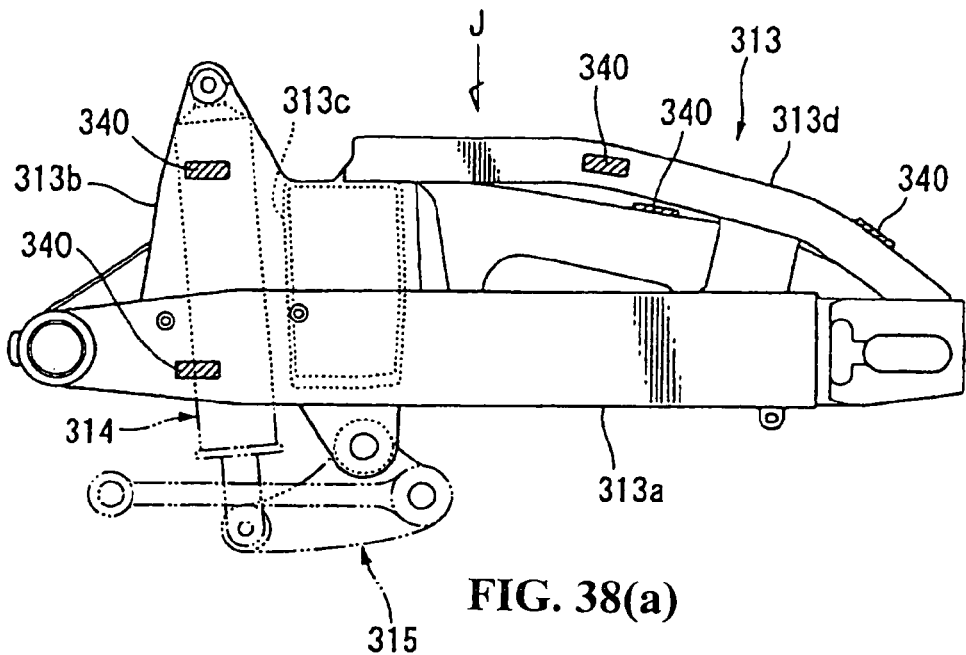
FIG. 38(a) is a side view of a swing arm as the rear wheel suspension system component.
Figure 38B:
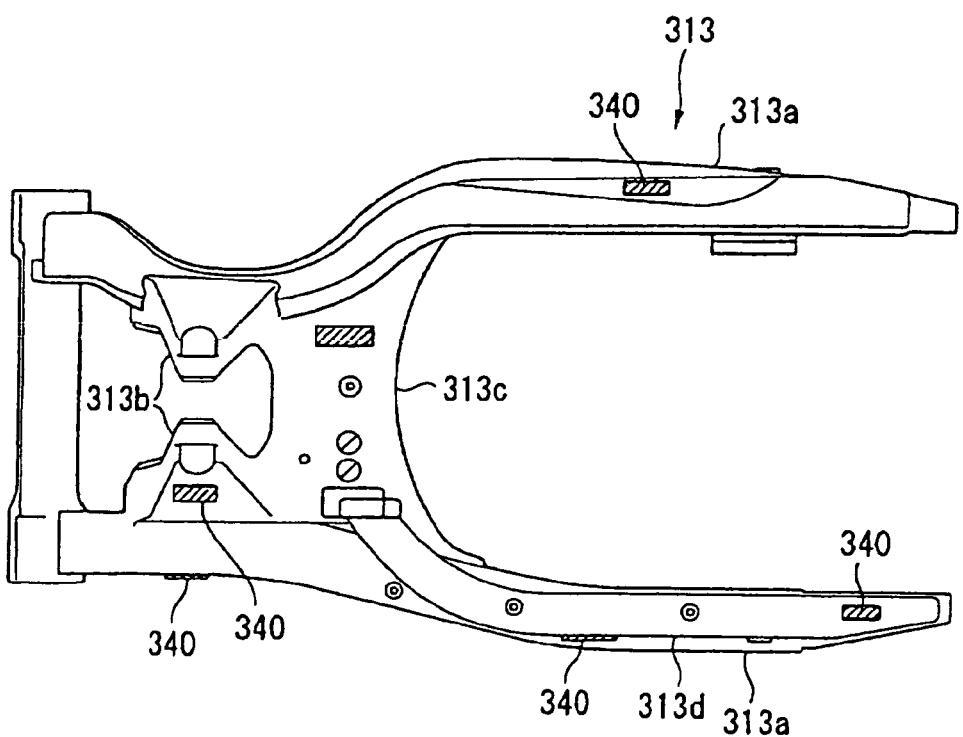
FIG. 38(b) is a drawing viewed in a direction indicated by an arrow J in FIG. 38(a)

FIGS. 38(a) and 38(b) show an example in which the IC tag 340 is provided on outer surfaces of components of the swing arm 313, which is a rear wheel suspension system component of the motorcycle 301.

More specifically, the IC tag 340 is provided on any one of an upper surface of an arm body 313a of the swing arm 313, an outer side surface of the arm body 313a on a proximal side (front end side) of the swing arm 313, an outer side surface of a projection 313b for supporting the shock absorber unit 314, an upper surface of a cross member 313c extending in the lateral direction, or an outer surface of a reinforcing frame 313d if it is provided on the arm body 313a.

In this manner, by providing the IC tag 340 on the outer surface of the swing arm 313, the existence thereof is hardly noticed by a third party in comparison with the case in which the IC tag 340 is provided on the side surface of the arm body 313a. Thus, an effect of an individual's mischief can be effectively prevented. In addition, an arrangement which is advantageous for communication is achieved in comparison with the case in which the IC tag 340 is provided on a lower surface of the swing arm 313. Furthermore, when the IC tag 340 is provided on the die-cast component of the swing arm 313, it can be easily integrated. Whether the swing arm 313 is a twin-sided type having a pair of left and right arm bodies or a single-sided type having either one of the left and right arm bodies is not important.

FIGS. 39 (a) and 39(b) show an example in which, when a wheel 362 of the front wheel 302 or the rear wheel 312 of the motorcycle 301 is a cast wheel formed by casting a rim portion 362a, an integral spoke portion 362b and a hub portion 362c is provided, for example, by using an aluminum alloy, with the IC tag 340 being provided on an outer surface of any one of these components.

In this case as well, by providing the IC tag 340 on an outer surface of the wheel 362, an arrangement which is advantageous for communication is achieved.

Figures 39A, 39B, 39C:
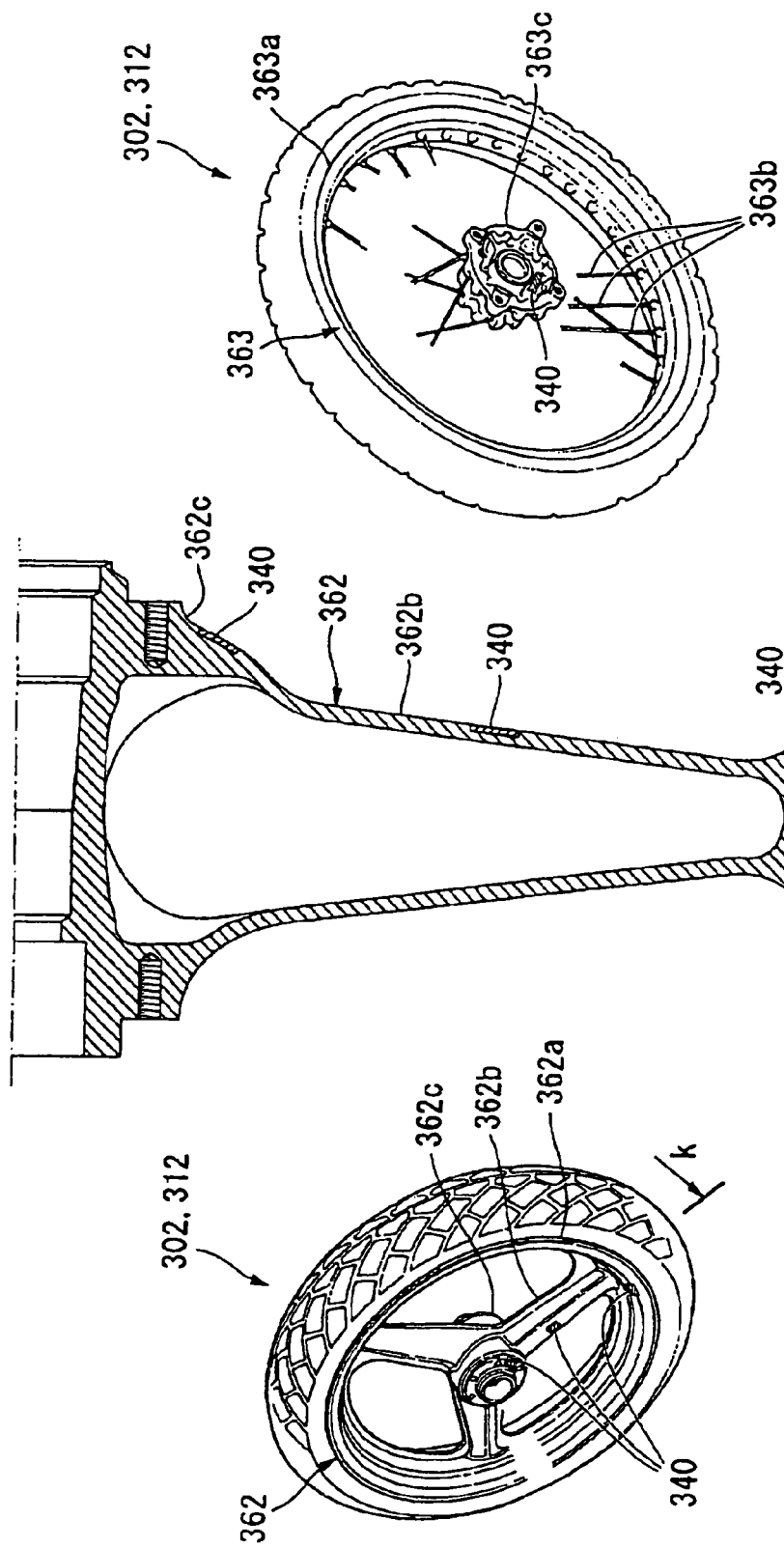
FIG. 39(a) is a perspective view of a front wheel or a rear wheel having a cast wheel.
FIG. 39(b) is a cross-sectional view taken along K in FIG. 39(a)
FIG. 39(c) is a perspective view of a front wheel or a rear wheel having a wire spoke wheel.

FIG. 39(c) shows an example in which, when a wheel 363 of the front wheel 302 or the rear wheel 312 of the motorcycle 301 is a wire spoke wheel formed by connecting a rim portion 363a, a hub portion 363c and a number of wire spokes 363b, the IC tag 340 is provided on an outer side surface of the hub portion 363c.

In this case, the die-cast hub portion 363c is normally favorable as a component for installing the IC tag 340, and by providing the IC tag 340 on the outer side surface of the hub portion 363c, an arrangement which is advantageous for communication is achieved. The above-described configuration can be applied to a wheel having an assembled structure in which the rim portion and the hub portion are connected by, for example, plate shaped spoke members.

Figure 40:
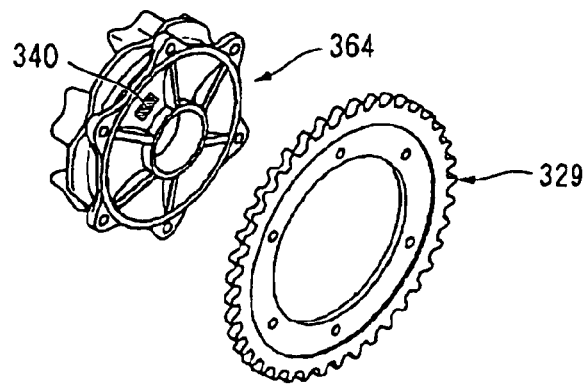
FIG. 40 is a perspective view of a driven flange.

FIG. 40 shows an example in which the IC tag 340 is provided on an outer side surface of a driven flange 364 that is engaged with the wheel hub portion of the rear wheel 312 of the motorcycle 301 via a damper rubber.

The driven flange 364 is normally a die-cast product, and the driven sprocket 329 is fixed to an outer side (left outer side) thereof. By providing the IC tag 340 on the outer side surface of the driven flange 364, an arrangement which is advantageous for communication is achieved, and the IC tag 340 can be easily integrated.

Figure 41:
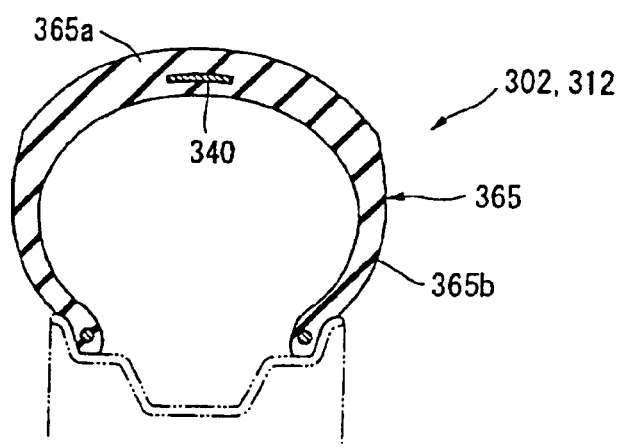
FIG. 41 is a cross-sectional view taken along a plane orthogonal to the circumferential direction of a tubeless tire.

FIG. 41 shows an example in which the IC tag 340 is provided in a tread portion 365a of a tubeless tire 365 of the front wheel 302 or the rear wheel 312 of the motorcycle 301.

Since the tread portion 365a has a higher rigidity in comparison with a sidewall portion 365b, and stress applied to the IC tag 340 is low, it is favorable as a position for installing the IC tag 340. In addition, the existence of the IC tag 340 is hardly noticed by a third party. Thus, the effect of an individual's mischief is effectively prevented.

Figure 42:
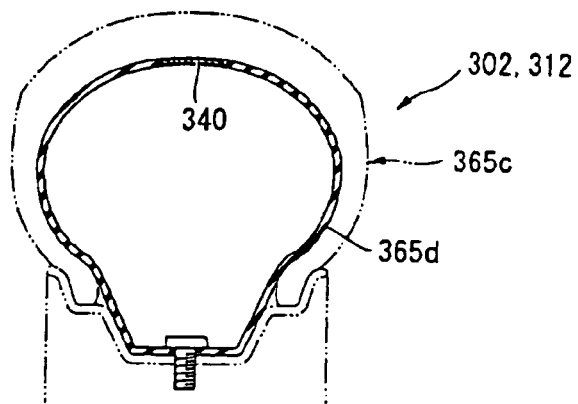
FIG. 42 is a cross-sectional view taken along a plane orthogonal to the circumferential direction of a tube tire.

FIG. 42 shows an example in which the IC tag 340 is provided in a tire tube 365d of a tube tire 365c of the front wheel 302 or the rear wheel 312 of the motorcycle 301.

In this case as well, the existence of the IC tag 340 is hardly noticed by a third party. Thus, the effect of an individual's mischief or the like is effectively prevented.

Figure 43:
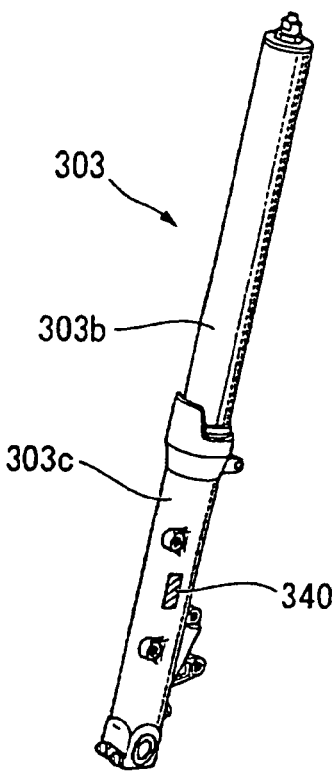
FIG. 43 is a perspective view of a front fork as a front wheel suspension system component.

FIG. 43 shows an example in which the IC tag 340 is provided on an outer surface of an outer tube 303a of the telescopic-type front fork 303, which is a front wheel suspension system component of the motorcycle 301.

In this case, the surface area for installing the IC tag 340 is wide. Thus, the flexibility in the layout design is increased and an arrangement which is advantageous for communication is achieved. When the outer tube 303a is a die-cast product, a recess for mounting the IC tag 340 can be formed easily. Thus, the IC tag 340 can be easily integrated. The front fork 303 in FIG. 43 is an upright type with the outer tube 303a on a lower side (front wheel 302 side) and an inner tube 303b on an upper side (steering stem 304 side). However, it may be an inverted type with the upper side and the lower side is counterchanged.

Figure 44:
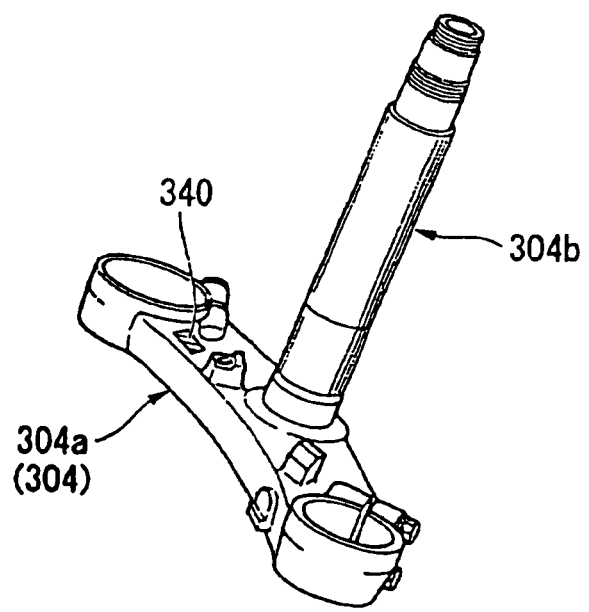
FIG. 44 is a perspective view of a bottom bridge as a front wheel steering system component.

FIG. 44 shows an example in which the IC tag 340 is provided on an upper surface of a bottom bridge 304a of a steering stem 304, which is a front wheel steering system component of the motorcycle 301.

The upper surface of the bottom bridge 304a has a wide surface area for installing the IC tag 340. Thus, the flexibility in the layout design is increased and an arrangement which is advantageous for communication is achieved. If the bottom bridge 304a is a die-cast product, the IC tag 340 can be easily integrated. A steering shaft 304b is provided which is rotatably supported by the head pipe 306.

Figure 45:
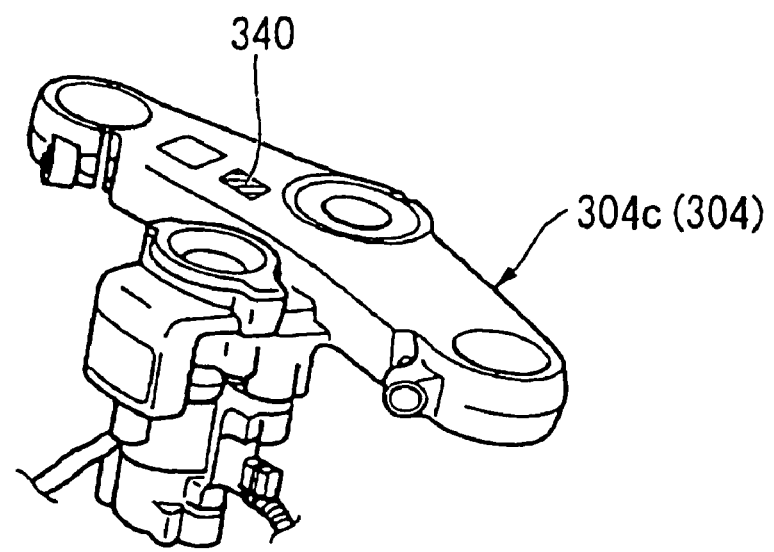
FIG. 45 is a perspective view of a top bridge as the front wheel steering system component.

FIG. 45 shows an example in which the IC tag 340 is provided on an upper surface of a top bridge 304c of the steering stem 304, which is a front wheel steering system component of the motorcycle 301.

In this case as well, the upper surface of the top bridge 304c has a wide surface area for installing the IC tag 340. Thus, the flexibility in the layout design is increased and an arrangement which is advantageous for communication is achieved. When the top bridge 304c is a die-cast product, the IC tag 340 can be easily integrated.

Figure 46:
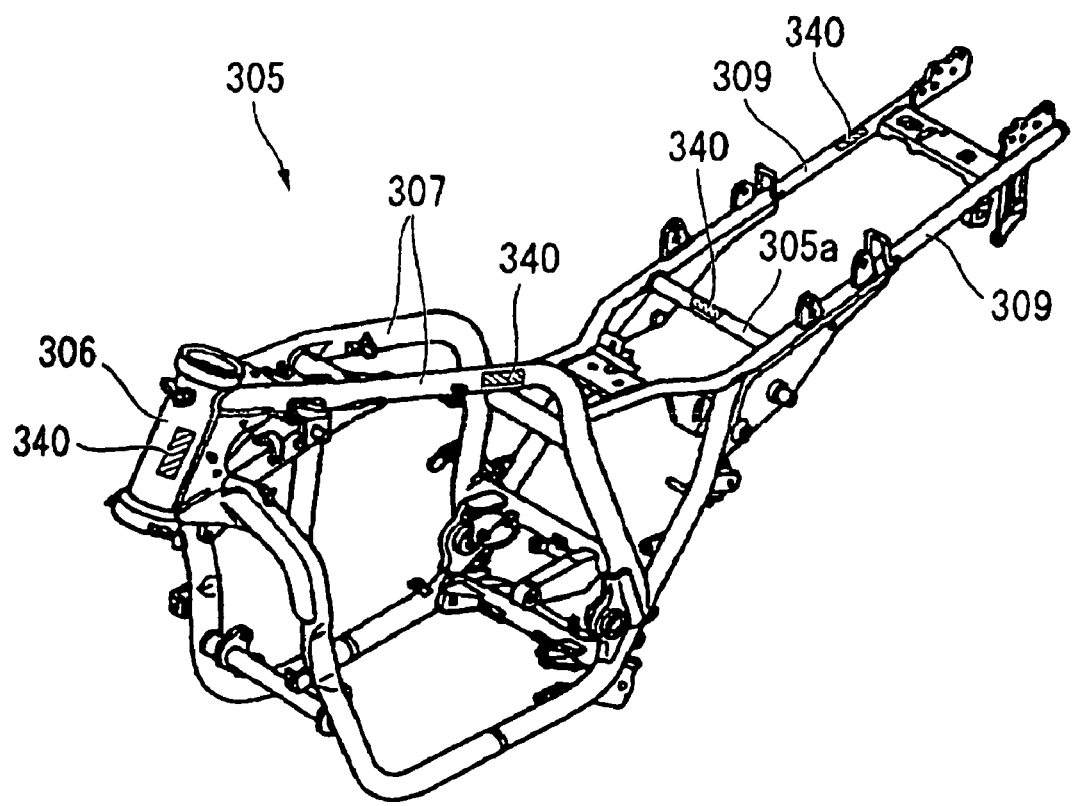
FIG. 46 is a perspective view of a vehicle body frame.

FIG. 46 shows an example in which the IC tag 340 is provided on the outer surfaces of the respective frame members of the vehicle body frame 305 of the motorcycle 301.

More specifically, the IC tag 340 is provided on any one of an outer side surface of the head pipe 306 of the vehicle body frame 305, an outer side surface of the main frame 307, an upper surface of a rear end portion of the seat frame 309, and an upper surface of a cross member 305a extending between the left and right frame members. By providing the IC tag 340 on the outer surface of the vehicle body frame 305, the IC tag 340 can exist semi-eternally on the motorcycle 301. For convenience of illustration, the vehicle body frame 305 in FIG. 46 is differentiated (double cradle type composed mainly of a steel pipe) from that of the motorcycle 301. However, when it is a twin tube type made of an aluminum alloy, the IC tag 340 is in the proximity of the appearance of the vehicle. Thus, a favorable communication is achieved. When the IC tag 340 is provided on the die-cast components of the vehicle body frame, these members can be easily integrated.

Figure 47:
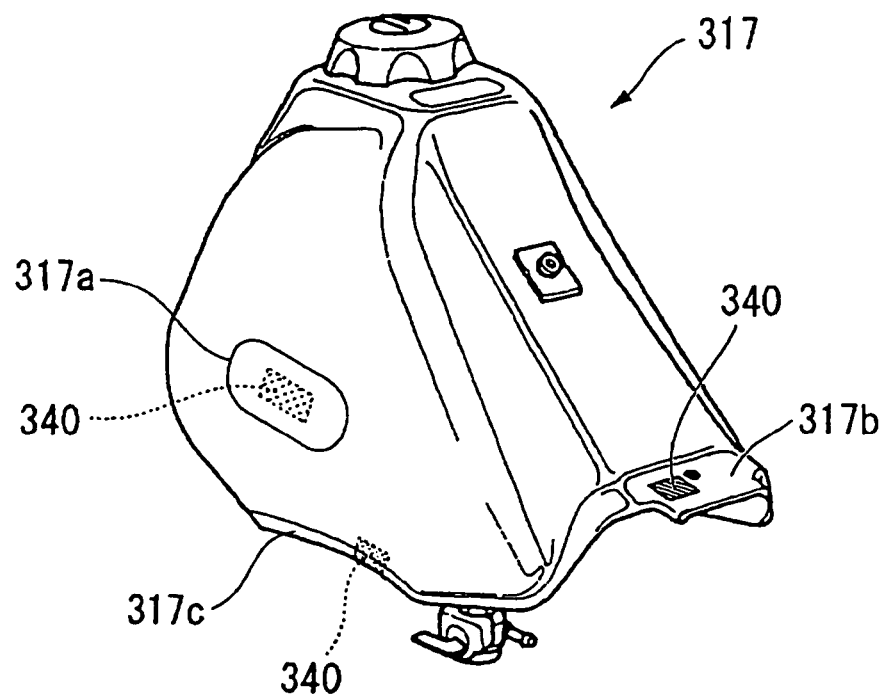
FIG. 47 is a perspective view of a fuel tank.

FIG. 47 shows an example in which the IC tag 340 is provided on the fuel tank 317 of the motorcycle 301.

The fuel tank 317 is, for example, a processed part of steel plate, that is part of the appearance of the vehicle. By providing the IC tag 340 on an outer surface of the fuel tank 317, an arrangement which is advantageous for communication is achieved. In this case, by arranging the IC tag 340 under an object 317a to be adhered integrally to the fuel tank 317 such as a sticker of a brand mark or a pet name or a label for caution or the like that are adhered together to the fuel tank 317, an arrangement in which the existence of the IC tag 340 can hardly be noticed by a third party is easily achieved.

Since a fixing portion 317b of the fuel tank 317 to the vehicle body is normally hidden by the seat or cowl or the like, such a portion is also favorable for arranging the IC tag 340. In addition, a back surface side of a welding flange 317c of the fuel tank 317 is also favorable for arranging the IC tag 340. Furthermore, when the fuel tank 317 is covered by the tank cover or the like, it is also possible to adhere the IC tag 340 to an outer surface of the fuel tank 317 or an inner surface of the tank cover with an adhesive agent, double-sided adhesive tape or the like. When the fuel tank 317 is a resin mold, the IC tag 340 may be integrated with insert molding.

Figure 48:
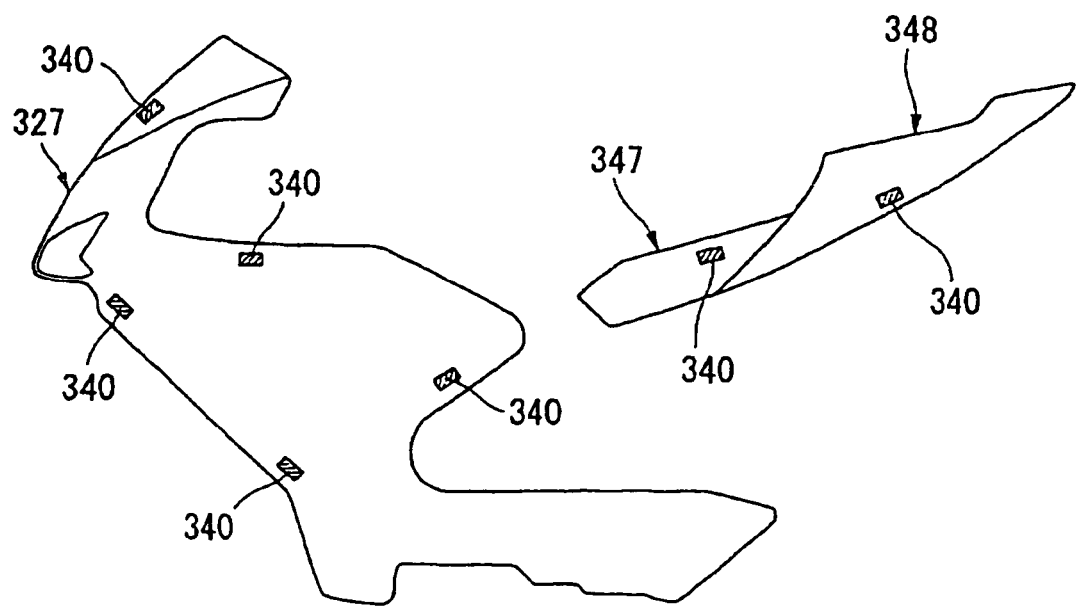
FIG. 48 is a side view of a front cowl, a side cover, and a tail cowl.

FIG. 48 shows an example in which the IC tag 340 is provided on any one of the front cowl 327, the side cover 347, and the tail cowl 348 being formed of resin and constituting the appearance of the vehicle body of the motorcycle 301.

In this arrangement, an arrangement which is favorable for communication without impairing the radio wave from the IC tag 340 is achieved. In addition, since the surface area for installing the IC tag 340 is sufficiently large, a flexibility in the layout design is significantly increased. The IC tag 340 may be easily integrated by insert molding thereof, or alternatively, the IC tag 340 can be provided under the sticker or the label. As in the case of the motorcycle 301 in the first embodiment, the IC tag 340 can be arranged in a meter unit 327b of the front cowl 327 also in the motorcycle 301 (see FIG. 8).

Figure 49:
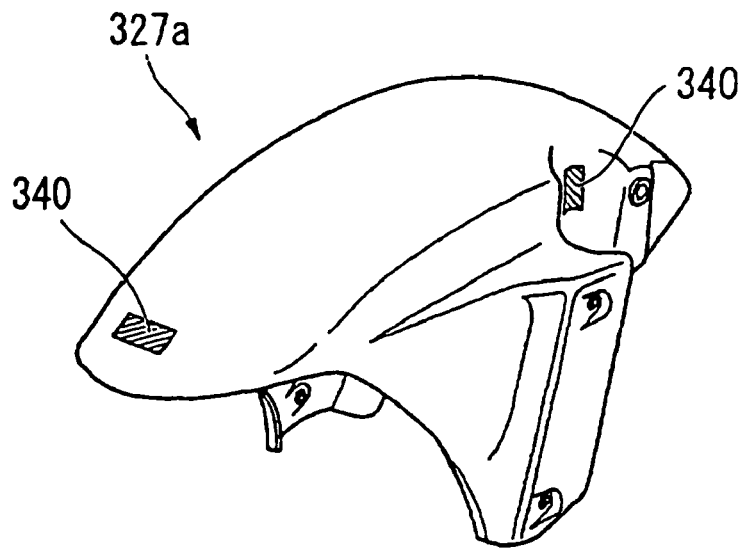
FIG. 49 is a perspective view of a front fender.

FIG. 49 shows an example in which the IC tag 340 is provided on a front fender 327a of the motorcycle 301.

In this case, for example, by providing the IC tag 340 on a front end portion of, for example, the front fender 327a, an arrangement which is favorable for communication is achieved. By providing the IC tag 340 on a portion of the front fender 327a which is overlapped with the front fork 303 in a side view, an individual's mischief can be effectively prevented. Furthermore, when the front fender 327a is a resin mold, the IC tag 340 can be easily integrated. The front fender 327a may be a processed part of steel plate.

Figure 50A:
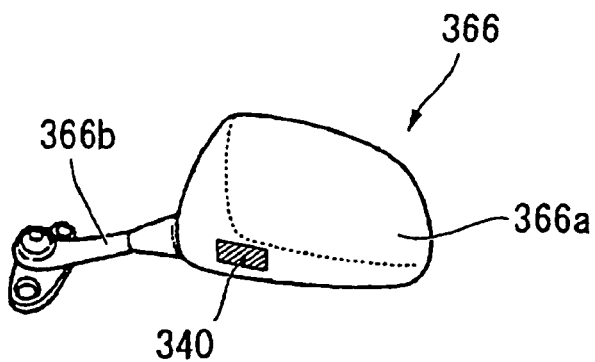
FIG. 50(a) is a perspective view of a back mirror having a stay formed of steel material.

FIG. 50(a) shows an example in which the IC tag 340 is provided on a mirror enclosure 366a of a back mirror 366 of the motorcycle 301.

In this case, the IC tag 340 is arranged at a position located above the vehicle body and overhung sideward together with the mirror enclosure 366a. Thus, an arrangement which is very advantageous for communication is achieved. In this case, when the mirror enclosure 366a is formed of resin mold, the IC tag 340 can be integrated by insert.

Figure 50B:
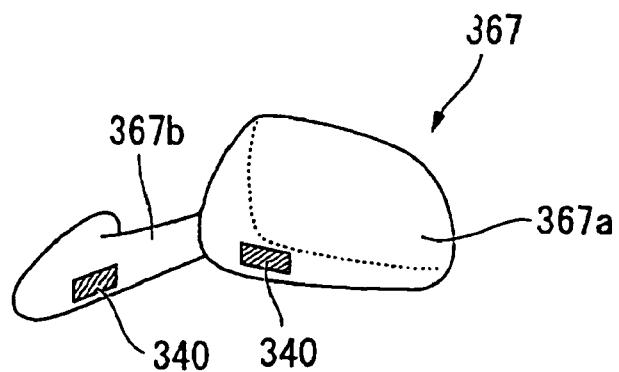
FIG. 50(b) is a perspective view of a back mirror of a resin mold or a die-cast product.

A stay 366b of the back mirror 366 is formed of a steel material, and a stay 367b of a back mirror 367 shown in FIG. 50(b) is a hollow resin mold or a die-cast product, and in this case, it is also possible to provide the IC tag 340 integrally with the stay 367b.

Whether or not the mirror enclosure 367a and the stay 367b of the back mirror 367 are integral is not important.

Figure 51A:
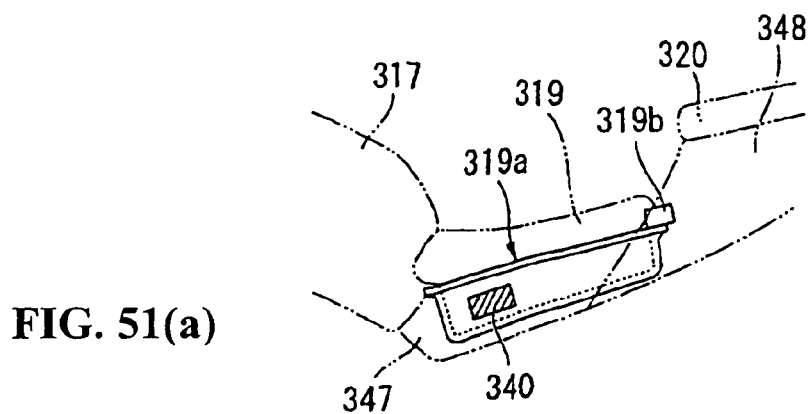
FIG. 51(a) is a side view of a storage box under a seat of the motorcycle shown in FIG. 18.

FIG. 51(a) shows an example in which the IC tag 340 is provided in a storage box 319a under the seat 319 of the motorcycle 301.

Since the storage box 319a is, for example, a resin mold product, the IC tag 340 can be integrated easily and an arrangement which is favorable for communication is achieved. Since the storage box 319a (seat 319) is provided with a locking mechanism 319b, by providing the IC tag 340 on the storage box 319a which can be locked, the IC tag 340 can be accessed at the time of communication, and cannot be accessed by a third party in the normal state, so that an individual's mischief or the like is effectively prevented.

Figure 51B:
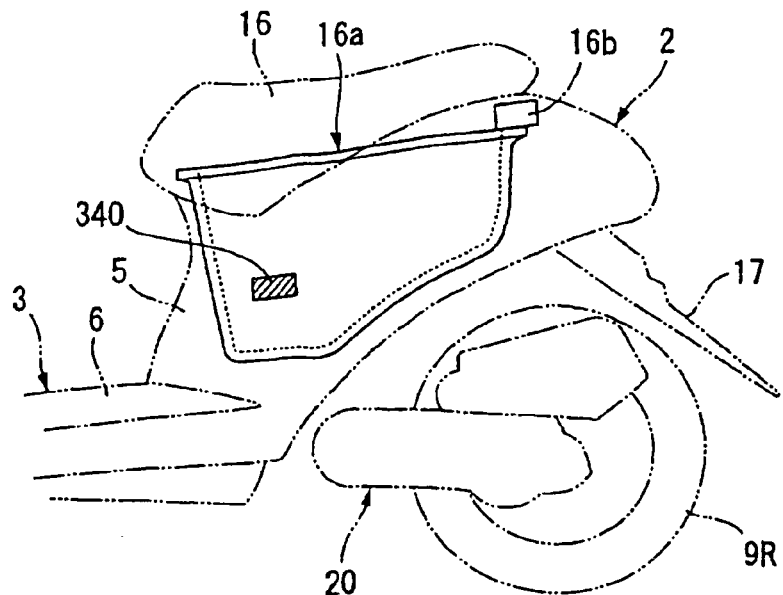
FIG. 51(b) is a side view of a storage box under a seat of the scooter type motorcycle shown in FIG. 1.

FIG. 51(b) shows an example in which the IC tag 340 is provided on a storage box (helmet box) 16a under the seat 16 of the scooter type motorcycle 1 shown in the first embodiment.

The above-described storage box 16a is a resin mold that includes a locking mechanism 16b. Therefore, when the IC tag 340 is provided on the storage box 16a, the same effects and advantages as those described above are achieved.

Figure 52A:
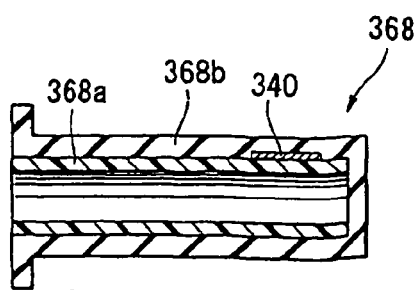
FIG. 52(a) is a cross-sectional view taken along an axis of a handle grip provided with a sleeve.

FIG. 52(a) shows an example in which the IC tag 340 is provided on a handle grip 368 of the motorcycle 301.

The handle grip 368 has a resin sleeve 368a as an inner layer and a rubber grip body 386b is integrally mounted thereto. When the IC tag 340 is provided on the handle grip 368, the IC tag 340 may be sandwiched between the sleeve 368a and the grip body 368b, or may be integrated by insert.

Figure 52B:
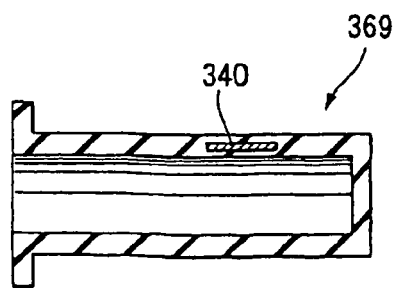

A handle grip 369 shown in FIG. 52(b) is a rubber single component, and when the IC tag 340 is provided on the handle grip 369, the IC tag 340 may be integrated with the handle grip 369 by insert.

Figure 53A:
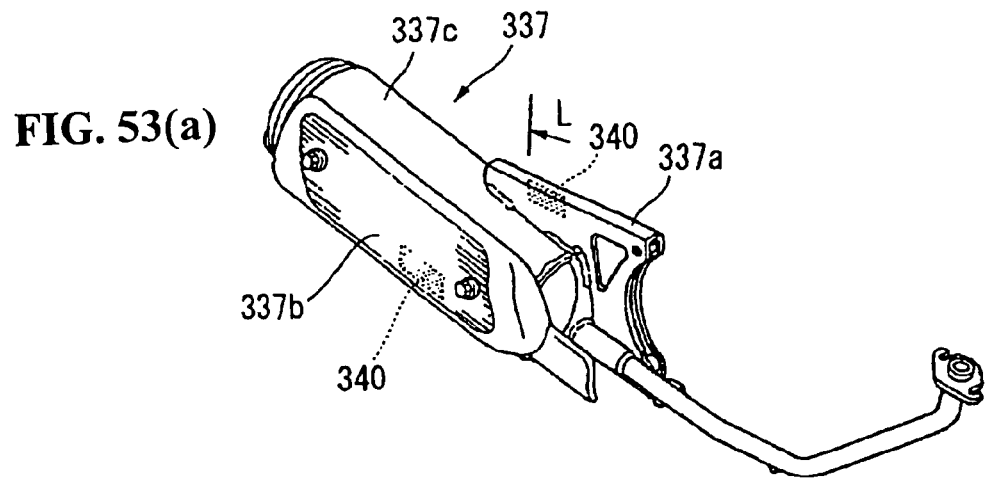
FIG. 53(a) is a perspective view of a muffler.
Figure 53B:
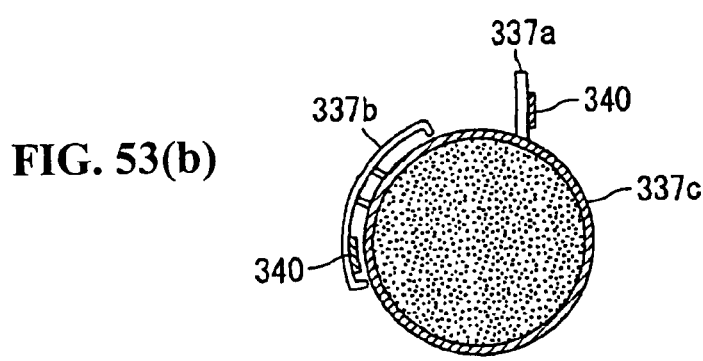
FIG. 53(b) is a cross-sectional view taken along a plane L in FIG. 53(a)

FIGS. 53(a) and 53(b) show an example in which the IC tag 340 is provided on a supporting stay 337a or a cover 337b of the muffler 337 of the motorcycle 301.

In this configuration, an arrangement which is advantageous in terms of heat is achieved in comparison with the case in which the IC tag 340 is provided on a muffler body 337c. In addition, since the existence of the IC tag 340 is hardly noticed by a third party, the effect of an individual's mischief or the like is effectively prevented. For the convenience of illustration, the muffler 337 in FIG. 53 is differentiated from that in the motorcycle 301.

Figure 54:
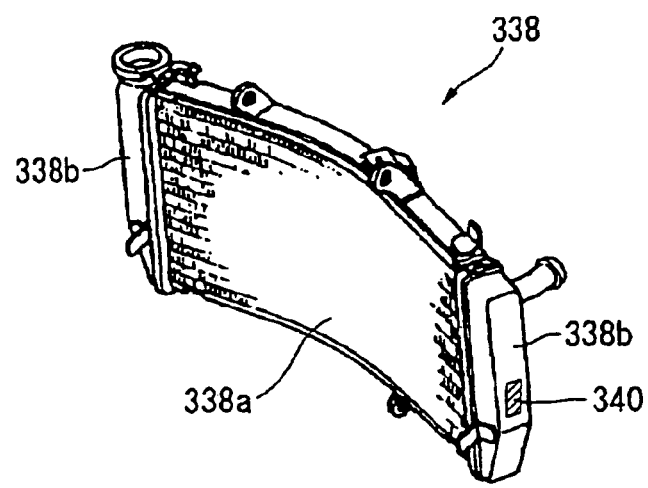
FIG. 54 is a perspective view of a radiator.

FIG. 54 shows an example in which the IC tag 340 is provided on an outer surface (outer side surfaces) of cooling water tanks 338b on both sides of a radiator core 338a of the radiator 338 for cooling the engine 318 of the motorcycle 301.

In this arrangement, cooling property of the IC tag 340 is improved and an arrangement which is advantageous for communication is achieved. Whether the radiator 338 is a cross-flow type or a vertical flow type is not important.

As described thus far, according to the embodiment shown above, by providing the IC tag 340 on main functional components of the engine 318 of the motorcycle 301, the probability that the IC tag 340 is replaced for repair or maintenance is reduced. Thus, the IC tag 340 can exist on the vehicle semi-eternally. Many of the engine system components are die-cast products. Thus, the recess or the like for mounting the IC tag 340 can be easily formed and easily integrated.

According to the embodiments shown above, since the IC tag 340 is mounted to the air-inlet system component which is located in the vicinity of the engine system component, the possibility that the IC tag 340 is removed for repair or maintenance is reduced. Thus, the IC tag 340 can be maintained on the vehicle for a long term. Since the air-inlet system components are less subject to heat from the engine and the cooling property thereof is favorable, an arrangement which is advantageous for durability of the IC tag 340 is achieved.

According to the embodiments described above, since the IC tag 340 is provided on the brake system component which is a predetermined important security component, the user rarely does maintenance on this component directly. Thus, the probability that the IC tag 340 is removed is reduced, whereby an arrangement which is favorable for maintaining the IC tag 340 for a long term is achieved.

According to the above-described embodiments, since the IC tag 340 is mounted to the rear wheel suspension system component of the motorcycle 301, the user rarely does maintenance on this component in the same manner as the description above. Thus, the probability that the IC tag 340 is removed is reduced, whereby an arrangement which is favorable for maintaining the IC tag 340 for a long term is achieved.

According to the above-described embodiments, since the IC tag 340 is mounted to the storage box having the locking mechanism, the access (mischief or the like) by a third party is effectively prevented. In addition, since the storage box is not exposed to the appearance of the vehicle, the probability of being replaced for repair or maintenance by the user is low. Therefore, an arrangement which is favorable for maintaining the IC tag 340 for a long term is achieved. Since many of the storage boxes are resin molds, the recess for mounting the IC tab 340 is formed easily and an insert molding of the IC tag 340 is also possible. Therefore, the IC tag 340 can be easily integrated.

In the above-described embodiments, although detailed example of articles and detailed data structure of information about articles are not specified, for example, as the specific examples of the articles, a vehicle other than the motorcycle 301 (such as passenger cars, buses, trucks, motorcycles, autocycles, bicycles, and four-wheel buggies), or aircrafts, ships, boats, yachts, and wet bikes are considered as transporting equipment.

Outputted information can be obtained by a person by writing at least one of registered information about the article (information about vehicle registration, information about the owner such as the name, address, e-mail address, and so on), and history information (history information such as manufacture, registration, transfer of the owner, fueling, maintenance, inspection, repair, replacement of components, export and import, deletion of registration, and so on) in a database in the external computer system or in the memory in the IC tag while relating to the identification of the articles, and outputting the registered information or the historical information relating to the individual article on the basis of the identified information.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mounting structure of an IC tag, in which predetermined information about a vehicle is registered, with respect to the vehicle comprising:
   mounting the IC tag to a main functional component of an engine of the vehicle,
   wherein the main functional component of the engine is selected from the group consisting of a cylinder, a cylinder head and a crankcase.

2. A mounting structure of an IC tag, in which predetermined information about a vehicle is registered, wit respect to the vehicle comprising:
   mounting the IC tag to an air-inlet system component of the vehicle.

3. The mounting structure of an IC tag according to claim 2, wherein the air-inlet system component is selected from the group consisting of a fuel supply device and an air cleaner box.

4. A mounting structure of an IC tag, in which predetermined information about a vehicle is registered, with respect to the vehicle comprising:
   mounting the IC tag to a brake system component of the vehicle.

5. The mounting structure of an IC tag according to claim 4, wherein the brake system component is selected from the group consisting of a brake caliper, a brake master cylinder, a brake reservoir tank, an ABS modulator, a drum brake panel and a brake hose.

6. A mounting structure of an IC tag, in which predetermined information about a vehicle is registered, to the vehicle comprising:

mounting the IC tag to a rear wheel suspension system component of the vehicle.

7. The mounting structure of an IC tag according to claim 6, wherein the rear suspension system component is selected from the group consisting of a swing arm and a shock absorber unit.

8. A mounting structure of an IC tag, in which predetermined information about a vehicle is registered, with respect to the vehicle comprising:

mounting the IC tag to a storage box of the vehicle.

9. The mounting structure for an IC tag according to claim 8, wherein the storage box includes a locking mechanism.

10. A mounting structure of an IC tag comprising:

an IC tag for containing at least one of a registration of a vehicle, recycling information and maintenance information;

said IC tag being adapted to be selectively connected to a host server for receiving information containing at least one of the registration of the vehicle, the recycling information and the maintenance information; and a mounting member for securing the IC tag in a secure location relative to a piston of an engine of the vehicle.

* * * * *